(12) United States Patent
Mitchell

(10) Patent No.: US 11,732,225 B2
(45) Date of Patent: Aug. 22, 2023

(54) USER INTERFACE FOR RECIPE CREATION

(71) Applicant: PicoBrew, Inc., Seattle, WA (US)

(72) Inventor: William H. Mitchell, Medina, WA (US)

(73) Assignee: PB Funding Group, LLC, Bellevue, WA (US)

( * ) Notice: Subject to any disclaimer, the term of this patent is extended or adjusted under 35 U.S.C. 154(b) by 1106 days.

(21) Appl. No.: 16/423,255

(22) Filed: May 28, 2019

(65) Prior Publication Data

US 2019/0276783 A1 Sep. 12, 2019

Related U.S. Application Data

(63) Continuation of application No. 15/416,315, filed on Jan. 26, 2017, now Pat. No. 10,822,580, which is a continuation of application No. 14/660,698, filed on Mar. 17, 2015, now Pat. No. 10,377,981.

(51) Int. Cl.
| | |
|---|---|
| *C12C 13/00* | (2006.01) |
| *C12C 7/06* | (2006.01) |
| *G05B 13/04* | (2006.01) |
| *C12C 7/20* | (2006.01) |
| *C12C 11/00* | (2006.01) |
| *G05B 17/00* | (2006.01) |
| *G05B 21/00* | (2006.01) |
| *G05B 15/02* | (2006.01) |

(52) U.S. Cl.
CPC ............... *C12C 13/00* (2013.01); *C12C 7/06* (2013.01); *C12C 7/205* (2013.01); *C12C 11/003* (2013.01); *G05B 13/041* (2013.01); *G05B 15/02* (2013.01); *G05B 17/00* (2013.01); *G05B 21/00* (2013.01)

(58) Field of Classification Search
None
See application file for complete search history.

(56) References Cited

U.S. PATENT DOCUMENTS

2012/0310413 A1* 12/2012 Bluck .................... G06N 20/00
703/11

OTHER PUBLICATIONS

Crandall et al., "EZ Mash Automated Brewing System", ECE4007 Senior Design Project, Dec. 11, 2008 (Year: 2008).*

(Continued)

*Primary Examiner* — Carlos R Ortiz Rodriguez
(74) *Attorney, Agent, or Firm* — Russell Krajec; Krajec Patent Offices, LLC

(57) ABSTRACT

A user interface for a beer recipe creator may have a series of icons that may represent ingredients. A user may drag and drop or otherwise add the icons to containers on a display screen to add or remove ingredients to the recipe. With each added or removed ingredient, a set of descriptors may be updated. The descriptors may include numerical values of beer parameters as well as textual descriptions and visual descriptions. The system may allow a user to start with a desired beer style, and the parameters may show variances from the selected style. The system may generate an ingredients list, as well as a brewing recipe that may be transferred to a controller for a beer making machine. The system may adjust certain parameters that are controllable by the beer making machine to make flavor and other adjustments selected by a user.

13 Claims, 17 Drawing Sheets

(56) References Cited

OTHER PUBLICATIONS

Berger, Joshua, "Automated Brewing Process", A thesis Submitted to the University Honors Program in Partial Fulfillment of the Requirements of the Baccalaureate Degree with Upper Division Honors Department of Mechanical Engineering, DeKalb, Illinois, May 11, 2013 (Year: 2013).*

* cited by examiner

600 RECIPE ADJUSTMENTS

FREESTYLE PICOPAK: Name Your Beer Here (Base Style)

A bold golden *saison* with sweet and toasted caramel notes. Features a crisp palate, and a dry finish with subtle herbal and citrus hop aromas.

| ABV: 5.3% | IBU: 56.5 | OG: 1,076 | FG: 1,029 | SRM: 16 |
|---|---|---|---|---|
| DEFAULT: 4.6% | DEFAULT: 44.2 | DEFAULT: 1.081 | DEFAULT: 1.031 | BJCP STYLE: 15 |

Grain Ingredients | Bittering Hops | Flavor & Aroma Hops

PICOPAK GRAIN INGREDIENTS:

Drag In/Out to Set Recipe

1102 SELECTED INGREDIENT — American Chocolate

1004 AVAILABLE INGREDIENTS:
- Belgian CaraMunich — 3.5 oz.
- American Chocolate — 7.0 oz.
- Belgian Special B — 7.0 oz.
- Roasted Barley — 14 oz.
- Base Grain (Am. 2R P) — 92 oz.
- Unused GRAIN 1014 — Belgian CaraMunich: 3.5oz / 2.8%
GRAIN 1012 — American Chocolate: 7oz / 5.7%
GRAIN 1010 — Belgian Special B: 7oz / 5.7%
GRAIN 1008 — Roasted Barley: 14oz / 11.3%
BASE GRAIN 1006 — Base Grain (Am. 2R Pale): 92oz / 74.5%

GRAIN CONTAINER 1002

Freestyle PicoPak: Custom Name (Base Style)   CURRENT PRICE: $32.95   [NEXT: BITTERING HOPS >]

Add to Cart As-Is / Save For Later

1000 USER INTERFACE

FIG. 11

FREESTYLE PICOPAK: Name Your Beer Here (Base Style)    1030 BEER TYPE

*A bold golden saison with sweet and toasted caramel notes. Features a crisp palate, and a dry finish with subtle herbal and citrus hop aromas.* — 1034 MOUTHFEEL/HOPS RELATED

HOPS CONTRIBUTION 1036

BITTERNESS 1310

| ABV: 5.3% | IBU: 56.5 | OG: 1.078 | FG: 1.029 | SRM: 17 |
|---|---|---|---|---|
| DEFAULT: 4.6% | DEFAULT: 44.2 | DEFAULT: 1.081 | DEFAULT: 1.031 | BJCP STYLE: 11-16 |

Grain Ingredients | Bittering Hops | Flavor & Aroma Hops

PICOPAK BITTERING HOPS:

Drag In/Out to Set Recipe

1302 AVAILABLE HOPS

Bittering Summit 14
Chinook 6
Amarillo
Brewer's Gold
Cascade

SECONDARY BITTERING 1308 — Chinook: 6 / 36% Bittering
BASE BITTERING 1306 — Summit: 14 / 64% Bittering

BITTERING HOPS CONTAINER 1304

[Chinook]
[Summit]

Freestyle PicoPak: Custom Name (Base Style)    CURRENT PRICE: $32.95  [NEXT: FLAVOR & AROMA HOPS >]
Add to Cart As-Is / Save For Later

1000 USER INTERFACE

FIG. 13

1600 METHOD FOR GENERATING RECIPE AND BREWING BEER

USER INTERFACE FOR RECIPE CREATION

CROSS REFERENCE TO RELATED APPLICATIONS

This application claims priority to and benefit of U.S. patent application Ser. No. 14/660,698, entitled "Software Tuning of Recipes for Beer Brewing System" filed on 17 Mar. 2015, and U.S. patent application Ser. No. 15/416,315, entitled "User Interface for Recipe Creation" filed 17 Jan. 2017, the entire contents of which are hereby expressly incorporated by reference for all they disclose and teach.

BACKGROUND

Beer making has been practiced for many years. Sugars are extracted from malted grains through a process called mashing. The sugars are boiled with hops, and the resultant wort is fermented with yeast. There are many styles of beers, each of which has is its particular character. The characteristics of a beer may be affected by many different adjustments of the mashing process, the boiling process, yeast characteristics, as well as other changes to the brewing process.

Automated or semi-automated beer brewing systems may have programmable controls for all or some portion of a brewing procedure. Some such systems may automate some or all of the mashing procedure, others may automate some or all of the boiling procedure. Such systems may include systems commonly known as recirculating infusion mash systems (RIMS) heat exchanger recirculating mash systems (HERMS), and others.

A typical characteristic of such automated or semi-automated beer brewing systems is that a programmable controller may execute a recipe program that may define a portion of the brewing process. For example, a system with automated mashing may follow a mash schedule that may heat water, add the heated water to grains, and control the temperature of the water/grain mash. In many cases, such a mashing schedule may hold at a first temperature for a designated time, adjust the temperature to a second temperature and hold for a second time, and so on. In the case of mashing, each temperature and hold time may cause certain enzymes to break down starches in the grains into different types of sugars, as well as other reactions. These reactions may cause different taste effects to occur in the resulting beer.

SUMMARY

A user interface for a beer recipe creator may have a series of icons that may represent ingredients. A user may drag and drop or otherwise add the icons to containers on a display screen to add or remove ingredients to the recipe. With each added or removed ingredient, a set of descriptors may be updated. The descriptors may include numerical values of beer parameters as well as textual descriptions and visual descriptions. The system may allow a user to start with a desired beer style, and the parameters may show variances from the selected style. The system may generate an ingredients list, as well as a brewing recipe that may be transferred to a controller for a beer making machine. The system may adjust certain parameters that are controllable by the beer making machine to make flavor and other adjustments selected by a user.

A beer making system may modify a beer making recipe to adjust sensory characteristics of a desired beer. With a given ingredient list and starting recipe, a performance model of a brewing system may be used to generate an updated recipe when given a target set of desired sensory characteristics of a desired beer. A user interface may permit a user to adjust characteristics such as thin/thick mouthfeel, dryness/maltiness, hops bitterness, hops flavor, hops aroma, and other characteristics. An updated recipe may then change mashing schedules, boiling schedules, or other programmatically controlled aspects of a brewing system. The performance model may include standard calculations and heuristics as well as performance metrics derived from observing previous brewing sessions on one or multiple devices.

An automated or semi-automated beer brewing system may adjust a brewing session based on data collected during the brewing session. The adjustments may attempt to achieve a set of desired taste characteristics, even though a brewing session may then deviate from an intended recipe. A performance model of the brewing system may include taste characteristic effects and operational aspects of an automated brewing system, and may be used to calculate changes to various brewing steps. A control system may analyze various measured parameters to determine deviation from an intended recipe, and may use the performance model to calculate updated brewing steps that may attempt to achieve the desired result. When such measured parameters indicate a malfunction, a brewing session may be paused or terminated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings,

FIG. 5 is not to scale.

FIG. 6 is not to scale.

FIG. 8 is not to scale.

FIG. 11 is a diagram illustration of an example embodiment showing a user interface for changing grains for mashing.

FIG. 13 is a diagram illustration of an example embodiment showing a user interface for selecting bittering hops.

DETAILED DESCRIPTION

User Interface for Recipe Generation

Figure 1:
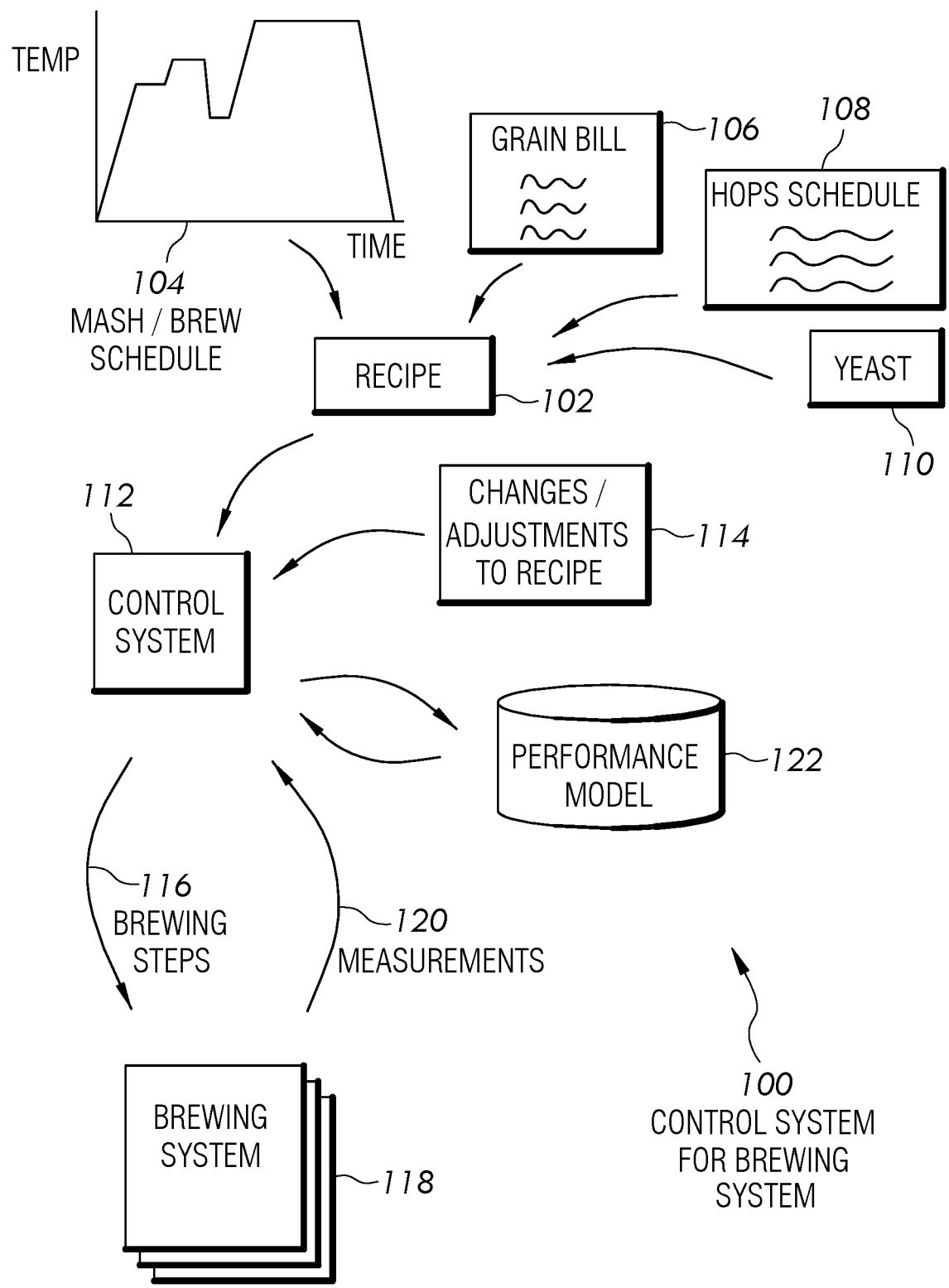
FIG. 1 is a diagram illustration of an embodiment showing control system for brewing systems.

A user interface for creating and modifying a beer recipe may contain icons that may be manipulated to add and remove ingredients to the beer. The icons may have descriptors that describe the characteristics that the ingredients contribute to the beer, which may help the user decide what ingredients to add and how much to add.

The icons may be selected from an inventory of ingredients, which may include ingredients for grain mashing as well as ingredients that may be used during a boil cycle. For grain mashing, the ingredients are primarily different types of malted barley as well as other grains, such as wheat, oats, and other grains. For the boil cycle, the ingredients are primarily different types of hops, although other adjuncts, flavorings, and other additives may also be added.

The icons may be dragged and dropped or otherwise manipulated to be added to the recipe. In one case, the icons may be added to a container, which may graphically represent elements of a beer making machine. In other cases, the container may represent a glass of beer, while other systems may use other graphical elements or metaphors.

As a user adds or removes icons, a set of beer descriptors may be updated to reflect the change. For example, a user may add Cascade hops. A descriptor of the icon in an ingredients list may indicate that Cascades hops have a citrus aroma. When a user adds sufficient Cascade hops icons to the container, the beer description may be updated to include "citrus" as a descriptor for the beer.

The user may be able to adjust the precise amounts of any ingredient to the recipe. In one implementation, each icon may represent a predefined amount of the ingredient. The user may add 2, 3, 4, or more icons to increase the amount of the icon. Other implementations may have a user interface mechanism where the user may adjust the amount of the ingredient.

The user interface may have a graphical representation of the quantity of the ingredient in the recipe. In the case of a system where each icon may represent a predefined amount of the ingredient, a user interface container may have many instances of the icons. In the case of a system where there may be other mechanisms for identifying the quantity of the ingredient, the size of the ingredient in the container may represent the amount of the ingredient.

Such a graphical representation may help a user design their beer by graphically showing the contribution of each ingredient to the overall beer. In the case of hops, a descriptor may show an amount of a specific variety of hops as well as the flavor contribution of that variety, with descriptors such as "fruity," "citrus," "spicy," or other descriptors. Such descriptors may assist a user in determining which ingredients are providing certain characteristics to the beer.

In some cases, the effects of an ingredient may be different based on where the ingredient is added in the user interface. Typically, hops play three different roles in contributing to beer flavor profiles. The first is bittering, which can be hops that may be added to a boil cycle at an early stage and may have the longest contact with the beer. The long contact time extracts the alpha acids in the hops, but it drives off the volatiles and other oils in the hops.

Hops that contribute to flavor may be added later in the boil cycle, sometimes in the last several minutes of the cycle. Flavor hops are in the boil cycle for a short period of time and may contribute slightly to the bittering, but are not in contact too long that the oils are driven off.

Aroma hops are added at the very end of the boil cycle. The aroma components come from the most volatile compounds in the hops and are easily driven off during boiling. These hops contribute most of the aroma components, to a lesser extent to the flavor, and very little towards the bittering.

Many user interfaces may have different containers or other visual elements that may separate the hops used for bittering, flavor, and aroma. The user interface may list the separate bittering, flavor, and aroma characteristics of certain hops varieties while those icons are in an inventory list, but may change the beer descriptors based on which container the hops may be placed. For example, a Cascade hops may contribute "citrus" to the flavor, but when placed in a bittering container, a descriptor may updated to only show the bittering contribution without describing the flavor or aroma contribution, since bittering hops do not make substantial contributions to flavor or aroma.

The user interface may allow a user to search for specific flavor elements, and may identify ingredients that may contribute to those flavor elements. In many cases, the ingredient list may be sortable or may otherwise assist a user in finding a desired flavor element to add to their recipe. A user may search for "malty" or "chocolate" to find grains that may contribute those factors, or may search for "flowery" or "spicy" to search for hops.

The system may allow a user to select a desired style of beer and may pre-populate the user interface with a starting recipe for the selected style of beer. Many beer styles may be defined by a target alcohol content, bitterness, starting gravity, finish gravity, color index, and other parameters. As the user makes adjustments to their recipe, the system may compare the user's recipe with the selected style of beer and identify when the recipe may be outside the standard parameters of the style. In some cases, the system may detect that the user's recipe more closely matches a second style and may indicate such on the user interface.

The system may generate an ingredient list for a desired beer once the user has finished with their recipe. The ingredient list may be a pick list for the desired beer, or may be used to generate an ingredient kit for an automated beer making machine. In either case, the system may substitute certain ingredients for other ingredients to create an equivalent ingredient list.

For example, a user may have selected some amount of Crystal 40 malt, which is a medium roast malted barley. The system may substitute an equal proportion of Crystal 60 and Crystal 20 as an equivalent. In another example, a user may have selected a Chinook hop with 10% alpha acids as a bittering hop. The system may substitute with virtually any other hop to achieve the equivalent bittering effect. Such a substitute is generally permissible because bittering hops provide very little flavor or aroma effect, so the variety of hops used for bittering is virtually immaterial.

The system may further generate a recipe program, script, or other machine-readable set of instructions for an automated brewing device. In such a case, the system may further adjust various flavor parameters, such as thin/thick mouthfeel, dryness/maltiness, hops bitterness, hops flavor, hops aroma, and other characteristics. An updated recipe may then change mashing schedules, boiling schedules, or other programmatically controlled aspects of a brewing system.

Software Tuning of Recipes for Beer Brewing System

A beer brewing system may have a programmable controller that may cause at least a portion of a beer brewing process to be automated. The programmable controller may execute a brewing recipe that may include either or both of mashing or boiling in the manufacture of wort. A recipe generator may generate brewing steps that may be executed by the programmable controller.

The recipe generator may adjust a recipe to reflect adjustments to various taste characteristics. In many cases, the recipe generator may be capable of adjusting taste characteristics given a fixed set of brewing ingredients.

For example, a user may select a baseline recipe for a type of beer. The baseline recipe may include a grain bill, hops schedule, yeast, and other ingredients to the beer. From the baseline recipe, a control system may be able to generate a set of brewing steps that, when executed, may generate the baseline beer.

The user may select adjustments to the baseline recipe through a user interface. The adjustments may include dry/maltiness, thick/thin mouthfeel, and various hops characteristics, such as bitterness, flavor, and aroma. The recipe may change various mashing steps, boiling steps, or other programmatically controlled variables to achieve the user's requested adjustments.

The adjustments may allow a user to change the outcome of a brewing session by changing the operational parameters of a brewing system without changing the ingredient list. Such a system may allow customization and personalization of a batch of beer in a simple, easy to use manner.

A recipe generator may further be used to generate multiple beer recipes from a common ingredient list. For example, a specific style of beer may be defined with a common ingredients list. Using the common ingredients list, a beer judge or other expert may attempt to match the flavor of examples of the style by changing the flavor characteristics of the baseline recipe. Using the recipe generator, drastically different beers may be generated from a starting ingredient list.

A recipe generator may use a performance model of a brewing system to calculate adjustments to brewing steps to meet a desired set of characteristics of a beer. The performance model may consist of multiple components, including heuristic and other guidelines that may be derived from human experts, as well as numerical and other measured data that may be collected from previous brewing sessions.

The performance model may include mathematical models of operational aspects of a brewing system. In a simple example, the temperature rise of brewing liquid while heating may be characterized by measuring multiple brewing sessions, with each brewing session generating several sets of measured parameters. After measuring multiple brewing sessions, a performance model of the temperature rise may be generated using regression or other statistical analysis. In some cases, the brewing sessions may be gathered from a single system or from multiple systems.

The performance model may include a model that may predict flavor characteristics based on mashing and boiling schedules. In some cases, various characteristics of beer may be defined using numerical values, such as the hops bitterness that may be defined using International Bittering Units (IBU), the Lovibond scale or Standard Reference Method (SRM) for color, original gravity (OG) or the BRIX scale for sugar content, and other factors. In many cases, these and other factors may be mathematically related to the brewing process steps in the performance model.

A control system may make changes to a brewing session by adjusting brewing steps to compensate for measured deviations from an intended brewing sequence. The control system may detect an offset from an expected measurement, then may use a performance model to calculate adjusted brewing steps. The adjusted brewing steps may be calculated to produce a similar beer to that originally intended, based on desired characteristics, including flavor characteristics.

The control system may receive measured parameters during a brewing session. When the measured parameters deviate from expected values, the control system may determine whether the deviation indicates an error condition that may prevent a successful brewing session completion. When the deviation is not determined to be an error condition, adjustments may be made to the brewing session.

The control system may enable a brewing system to produce consistent quality beers from one session to another even though there may be differences in performance during the brewing session. Such a system may ensure consistent performance from one brewing system to another when multiple systems are deployed in the field, as well as consistent performance even though a brewing system may change over time or operate under different conditions. Such a system may tolerate a large variability in hardware while still producing consistent, high quality beers.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory. When the subject matter is embodied in "non-transitory" media, the media may be any storage media that expressly does not include live signals.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100 showing a control system for a brewing system. A control system 112 may execute a recipe 102 with a brewing system 118. Embodiment 100 is merely one example of a system that may adjust recipes to match user adjustments, as well as to monitor and control a brewing system to meet a set of desired characteristics for a beer.

Embodiment 100 illustrates various functional elements of a beer brewing control system. The control system 112 may serve two major functions: before starting a brewing session, the control system 112 may modify various components of a recipe 102 to meet changes or adjustments 114 that a user may wish to make to the resulting beer. In a second function, the control system 112 may monitor a brewing system 118 during execution, and may make changes to various brewing steps in order to compensate for the brewing system performance yet still yield a beer with the desired qualities.

A recipe 102 may be composed of several components, including a mashing and brewing schedule 104, a grain bill 106, a hops and adjunct schedule 108, and a yeast 110. A recipe 102 may also include other adjuncts or additives, processing steps, or other components. A mashing and brewing schedule 104 is an illustration of the processing steps for grain mashing and boiling. In some embodiments, such a schedule may be separated into separate mashing and boiling schedules, depending on the automation capabilities of the brewing system.

A grain bill 106 may list the grains and adjuncts that may be present during the mashing portion of wort manufacturing. A typical grain bill may have malted barley, wheat, oats, rice, corn, or other grains, as well as adjuncts, additives, extracts, or other ingredients. In a typical mashing operation, ingredients of the entire grain bill may be added to a mashing vessel, then water may be added and the temperature controlled to break down starches in the grains into various sugars. The sugars and other components may be extracted into wort and the spent grains subsequently discarded.

A hops schedule 108 may define the hops and other additives to be used during a boil portion of wort manufacture. The hops schedule 108 may define which amounts and varieties of hops may be added at different points during a boil operation. Typically, hops for bitterness may be added early in a boil operation, flavor hops may be added in the middle, and aroma hops added at the end. The hops schedule 108 may also define other additives, such as flavor extracts, herbs, or other additives, as well as when those additives may be added to the wort.

A recipe 102 may begin with a baseline recipe to which various changes or adjustments 114 may be made. The changes or adjustments 114 may be customizations that may be made to the recipe 102 to change the characteristics of the resultant beer. A control system 112 may use a performance model 122 to calculate changes to ingredients or to the mashing and brewing schedule 104 to achieve desired characteristics of the resultant beer.

The control system 112 may transmit brewing steps 116 to a brewing system 118, which may execute the recipe 102. During execution, the brewing system 118 may take various measurements 120, which may be analyzed by the control system 112. When the measurements 120 may indicate that an error may occur, the control system 112 may cause the brewing system 118 to pause or stop operations. When the measurements 120 may indicate that the desired beer may still be attainable with modifications to the brewing steps 116, the control system 112 may update the brewing steps 116 and continue the brewing process.

The brewing system 118 may be any type of brewing system that may have a programmable controller that may execute the brewing steps 116. Some brewing systems may have controllers that monitor and control a portion of a mashing sequence, others may monitor and control a portion of the boiling sequence, and still others may monitor and control both mashing and boiling.

Figure 2:
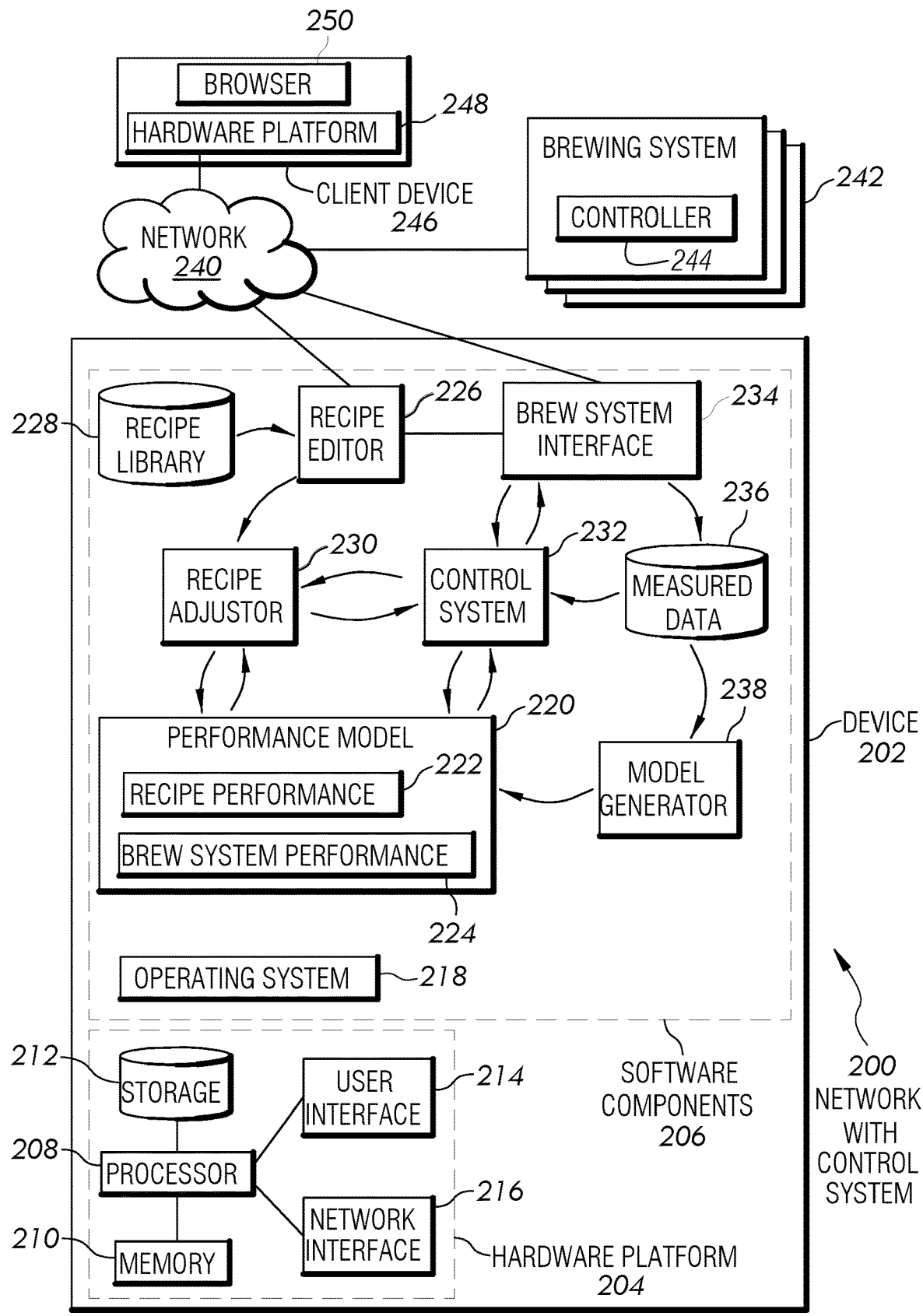
FIG. 2 is a diagram illustration of an embodiment showing a schematic or functional representation of a network with a control system.

FIG. 2 is a diagram of an embodiment 200 showing components that may manage recipes and brewing systems using a performance model. The components are illustrated as being connected across a network 240.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate.

A performance model 220 may be an expression of interactions and relationships between ingredients and processing variables that may produce beers. The expression may take many forms, including heuristics, rules, formulas, algorithms, and other expressions that may be used to determine changes to recipes and steps performed by brewing systems to meet desired characteristics of a resulting beer.

The performance model 220 may include a recipe performance model 222 that may model effects of ingredients and processing information to predict the characteristics of a beer, as well as a brew system performance model 224. Using the performance model 220, a system may be able to calculate an ingredient list and processing steps to meet a desired beer's specification and parameters.

In one use case, an ingredient list may be predetermined, and the performance model 220 may be used to calculate processing steps that may attempt to match a set of desired characteristics. An example may be that a user has a set of ingredients and may be preparing to brew a batch of beer, but the user may wish to have a thicker mouthfeel and less bitterness in the batch. The performance model 220 may be able to hold the ingredient list constant, and make adjustments to the brewing steps to achieve the user's request.

The recipe performance model 222 may be a portion of the performance model 220 that may determine effects of ingredients and processing steps to the resulting beer. The brew system performance model 224 may be a portion of the performance model 220 that may predict expected performance metrics of a given brewing system.

The brew system performance model 224 may contain a statistical model of brewing systems and may predict various performance aspects of a brewing system. Such a model may be useful to estimate performance characteristics that may be used by a recipe model to predict the characteristics of a resulting beer. In one use example, the brew system performance model 224 may predict the rate at which temperature rises or falls when heat may be added or removed from the system. Such a rate may be used to generate a mash schedule, which may be analyzed by the recipe performance model to predict beer characteristics.

The brew system performance model 224 may be used during a brewing session to determine error conditions or to make adjustments to the brewing session. The brew system performance model 224 may generate an expected system behavior, then a control system may compare the expected system behavior to an observed or measured system behavior. When there is a deviation, a control system may abort, pause, or continue the system operation. In some cases, the control system may make changes to the brewing session to attempt to meet a user's desired characteristics.

A statistical model in a brew system performance model 224 may be constructed from measurements from many brewing sessions. In some cases, the same brewing system may be used for each brewing session, while in other cases, different brewing systems may be used. When multiple brewing systems are used, the brewing systems may be identical, similar, or have widely varying characteristics. Such a statistical model may be useful to predict the performance of a new brewing system with some certainty, even though the new brewing system may not have been used before. Such a system may also be updated as new brewing sessions are captured from various brewing systems.

In some cases, a statistical model may be trained by presenting one or more examples of specific scenarios to a model generator 238 used to generate the models. For example, a scenario may include operating a brewing system with a hose disconnected, with a failing heat exchanger, or with some other condition. The model may be trained with such scenarios and may be used to identify the scenarios as they occur. Once identified, a user notification may be sent to correct the situation and continue brewing, for example.

A recipe editor 226 may be an application through which a user may select a recipe from a recipe library 228 and may edit or adjust the recipe. In some cases, the recipe editor 226 may allow a user to construct a new recipe from scratch. A typical recipe editor 226 may generate a grain bill, hops schedule, yeast selection and schedule, and other ingredients and additions. The recipe editor 226 may also generate brewing process parameters, such as a mashing schedule, boiling schedule, fermentation schedule, and other parameters.

A recipe adjuster 230 may make adjustments to a given recipe using the performance model 220. In one use scenario, a user may wish to adjust a recipe for certain flavor and taste characteristics. The recipe adjuster 230 may attempt to change the processing parameters of the recipe to meet the user's selected characteristics while keeping the ingredient list the same. The recipe adjuster 230 may generate a new set of brewing steps that may customize the recipe by controlling and operating a brewing system in a different manner. In a simple example, a user may desire a higher maltiness in a beer, and the recipe adjuster 230 may adjust the mashing schedule to increase alpha amylase extraction.

A brew system interface 234 may communicate across a network 240 to a brewing system 242. The brew system interface 234 may transmit a recipe to the brewing system 242, and the brewing system controller 244 may execute the recipe. The brew system interface 234 may receive measurements and status updates from the brewing system 242 while the recipe executes.

A control system 232 may receive status updates and measurements through the brew system interface 234. The measured data 236 may be analyzed by the control system 232 during a brewing session for anomaly detection and for making changes to a brewing session when a deviation is identified.

The control system 232 may detect anomalies during a brewing session. An anomaly may be severe, where the brewing session may be aborted. In some cases, an anomaly may be a condition where the brewing session may be paused and a user may be alerted to correct a situation. In other cases, an anomaly may be identified but the brewing session may continue. In still other cases, a control system 232 may attempt to rectify the situation by changing brewing steps to still yield a desired beer.

The brewing system 242 may be any type of brewing system with a programmable controller 244. In some cases, the programmable controller 244 may be used to control the entire brewing process, while in other cases, the programmable controller 244 may be configured to manage a subset of the brewing process. In a typical example, the controller 244 may be used to control mashing, boiling, or both mashing and boiling.

The device 202 is illustrated as a single device operating on a hardware platform. In some cases, the device 202 may be a cloud service that may provide the various operations, and a user may access such a service using a client device 246, which may have a hardware platform 248 on which a browser 250 or other application may execute. Such a client device 246 may be separate from the brewing system 242 in some cases. In other cases, the brewing system 242 may have a user interface through which the various services illustrated on device 202 may be accessed.

Figure 3:
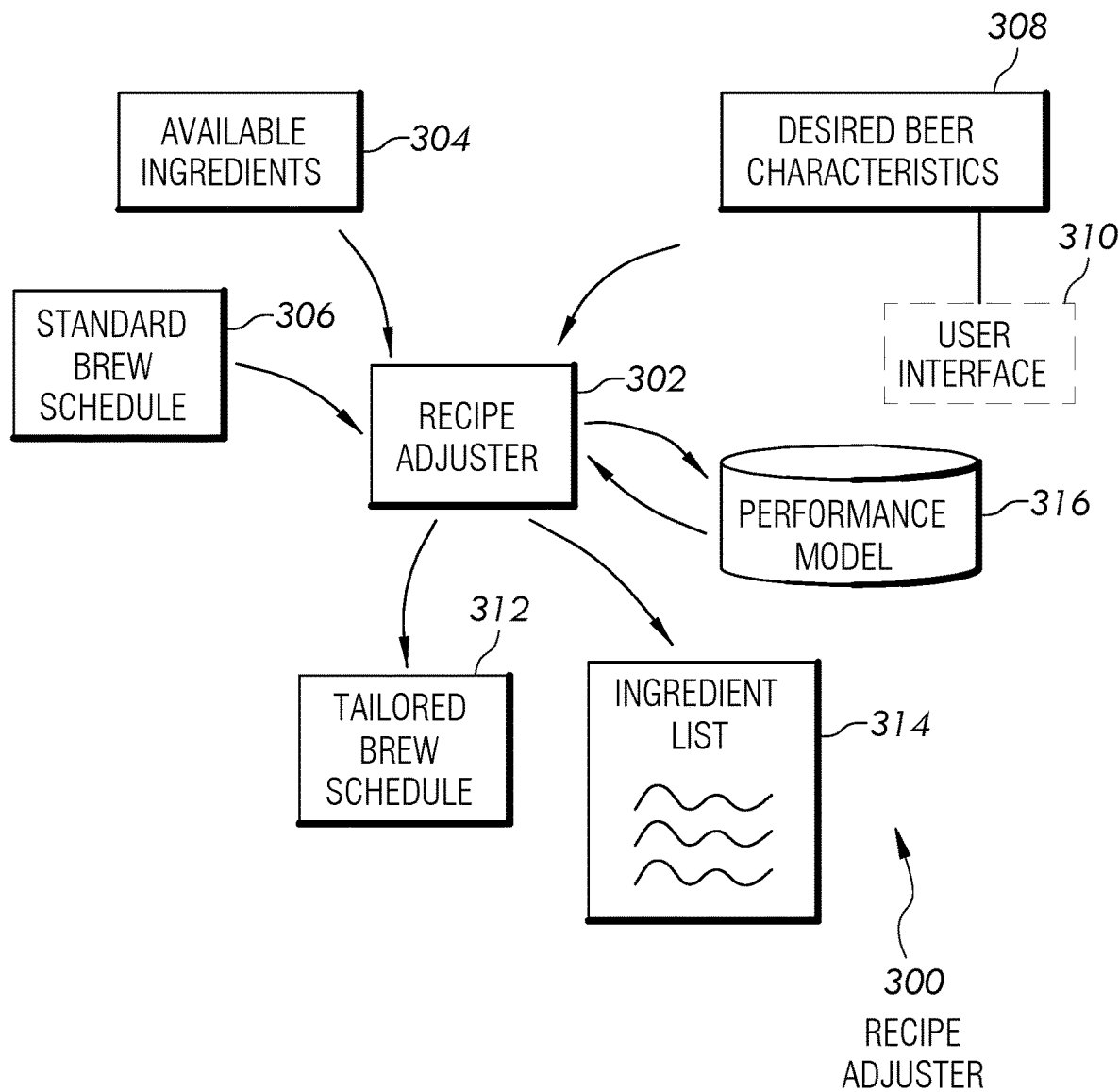
FIG. 3 is a diagram illustration of components that may make up a recipe adjuster.

FIG. 3 is a diagram illustration of an example embodiment 300 showing a recipe adjuster 302. Embodiment 300 can be used to illustrate several manners in which a recipe adjuster 302 may be used prior to brewing.

The recipe adjuster 302 may receive available ingredients 304 and a standard brew schedule 306. In a typical use case, the ingredient list and brew schedule may be defined through a recipe in a library or through a user who may use a recipe editor.

The recipe adjuster 302 may be able to determine a baseline set of beer characteristics given an ingredient list and brew schedule. The beer characteristics may be calculated using a performance model 316.

A set of desired beer characteristics 308 may be generated through a user interface 310. The desired beer characteristics 308 may be used to create a tailored or updated brew schedule 312 and, in some cases, an updated ingredient list 314.

One use scenario for a recipe adjuster 302 is to begin with a fixed ingredient list 304 and create a customized beer by varying the brew schedule 312 to meet a set of desired beer characteristics 308. Such a scenario may be implemented as a customizer for a consumer level brewing system, where a consumer may craft their beer to suit their individual tastes.

In another use case, a standard ingredient list may be used to generate several different beers. The recipe adjuster 302 may receive several different sets of beer characteristics 308, and may generate tailored brew schedules 312 for each of the sets of beer characteristics. Such a scenario may be useful when a beer judge or expert may classify three or four similar commercial beers based on their characteristics, then use a common ingredient list to generate tailored brew schedules that mimic the commercial beers. Then, a consumer may purchase a single set of ingredients and using a programmable brewing system, may be able to select from and replicate the commercial beers using the tailored brew schedules.

In still another use case, a brewer may have a certain set of available ingredients and the recipe adjuster 302 may be able to substitute the available ingredients into a recipe to generate a desired beer. For example, a brewer may have a dark roasted malt and may wish to make a recipe that may call for a medium roasted malt. The recipe adjuster 302 may be able to adjust the quantity of dark roasted malt lower and increase the quantity of another grain to achieve the desired color and taste profile of the resulting beer. The recipe adjuster 302 may also adjust the brewing parameters to achieve the desired characteristics of the resulting beer. In such an example, a brewer may be able to make a desired beer even when the precise ingredients may be not be available.

Figure 4:
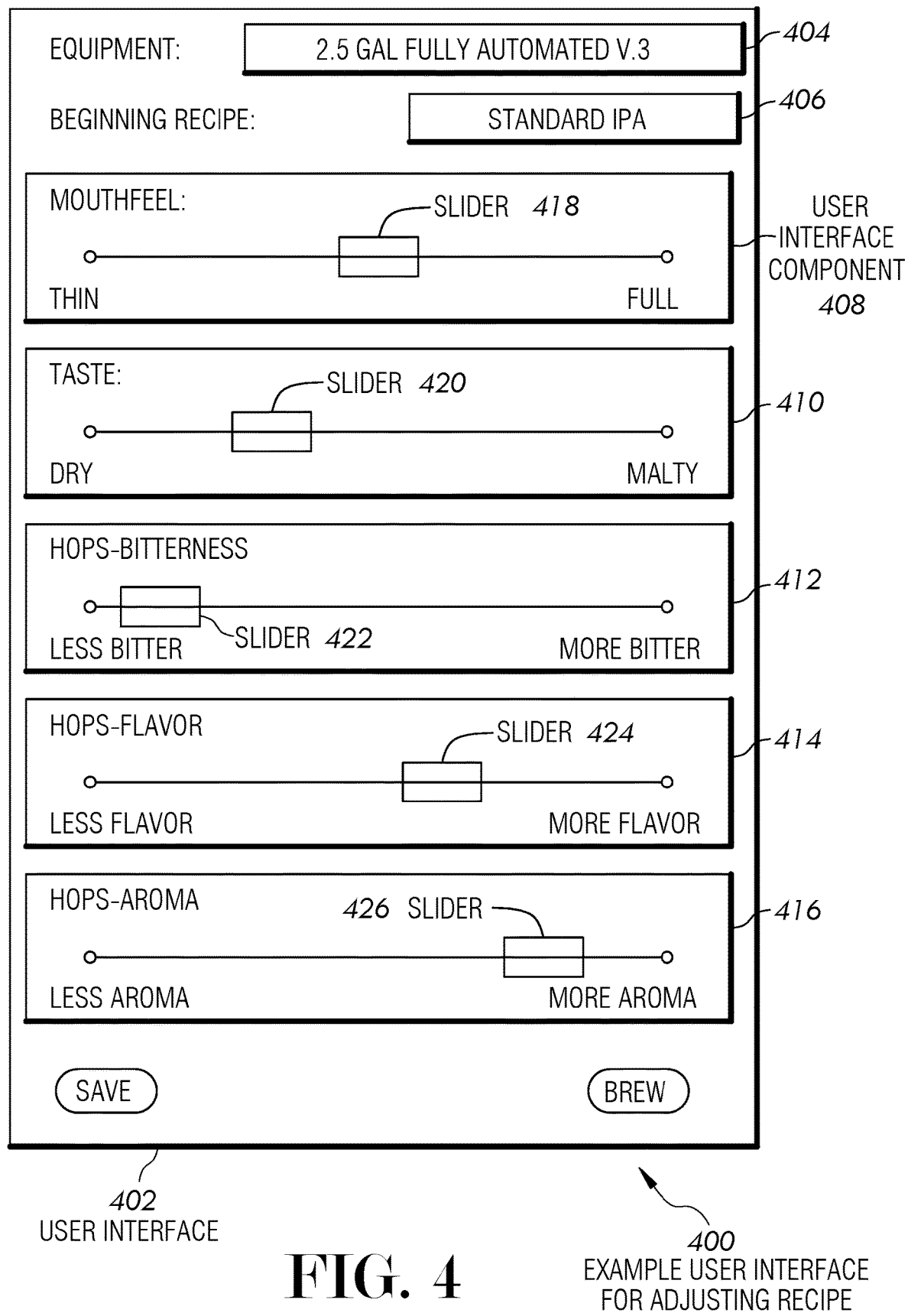
FIG. 4 is a diagram illustration of an embodiment showing an example user interface for adjusting recipes.

FIG. 4 is a diagram illustration showing an example embodiment 400 that shows an example user interface 402 through which a user may modify a brewing recipe. The user interface 402 illustrates merely one mechanism by which a user may tailor a beer to be made using a programmable brewing system.

The user interface 402 may be one mechanism by which a user may input changes to a brewing recipe, and in many cases, the changes may be implemented by changing or modifying brewing steps without modifying a set of ingredients for a batch of beer. A user may adjust various taste parameters of a beer, and a recipe adjuster may use a performance model to modify mashing schedules, boiling schedules, or make other adjustments to achieve a user's desired set of beer characteristics.

In the user interface 402, the equipment 404 and recipe 406 are illustrated. The recipe 406 may include a set of ingredients as well as a starting set of brewing steps that may make up the various brewing schedules. The user interface 402 may include a number of user interface components 408, 410, 412, 414, and 416, through which a user may adjust sliders 418, 420, 422, 424, and 426.

The example of user interface 402 contains adjustments to mouthfeel, taste, hops bitterness, hops flavor, and hops aroma. These examples are merely five examples of taste and flavor parameters that a user may adjust by changing the brewing steps using an automated brewing system.

Mouthfeel may have a user interface component 418 containing a slider 418 by which a user may be able to adjust from thin to thick. In general, mouthfeel may be affected by the amount of long chain saccharides as well as the solids in the beer. In order to increase the thickness of the beer, changes may be made to a mashing schedule to increase alpha amylase extraction. Such changes may include a section of the mashing schedule that holds the mash temperature from 156 F to 170 F, when the alpha amylase may be dominant. In order to make the beer more thin, the mashing schedule may be modified to emphasize beta amylase, which may be dominant at temperatures of 130 F to 148 F.

In some cases, changes to the mashing schedule may involve raising or lowering a single step infusion mash by a certain temperature. In other cases, changes to the mashing schedule may involve introducing multiple steps, where each step may emphasize certain reactions. Such changes may involve increasing or decreasing the time during a step, raising or lowering a step temperature, or a combination of both.

Taste adjustments from dry to malty may be adjusted using the user interface component 410 and slider 420. Maltiness or dryness may be affected by the amount of simple sugars or shorter chain saccharides, such as degree of polymerization (DP) of 4, 5, 6, or so. This may be achieved by changing the mashing schedule. For example, to make a beer with increase maltiness, the overall mashing schedule may be shortened to increase the amount of unfermentable sugars that may be present in the resulting beer. A request for increased dryness may be achieved by a longer mashing schedule that may convert more longer chained saccharides into fermentable sugars.

Hops bitterness may be adjusted through the user interface component 412 and slider 422. Hops bitterness may be adjusted by the length of time that bittering hops are in the boil schedule. By adding bittering hops later into a boil sequence, less bitterness will be imparted into the beer. By increasing the time the bittering hops are in the boil sequence, more bitterness may be induced. In general, bittering hops may be in a boil schedule for most, if not all, of the boil schedule, which may be 60-90 minutes or longer. In some cases, the boil schedule may be shorter than 60 minutes.

Hops flavor may be adjusted through the user interface component 414 and slider 424. Hops flavor may be adjusted by the length of time that flavor hops are in the boil schedule. In general, flavor hops may be added in the middle of a boil schedule, often with 10-30 minutes left in the schedule.

In general, boiling hops may add aroma and flavor initially, then as the hops remain in the boil, the aroma effects may boil off and be lost, while the flavor aspects may increase. As the boil progresses, the flavor effects may boil off and be lost as the bitterness aspects dominate the hops contribution to the beer wort.

The flavor effects of hops may be increased by keeping the flavor hops in the boil schedule for an optimum time, which may be 20-30 minutes, and may be minimized by either increasing past the optimum time or decreasing before the minimum time. Flavor hops that may be kept in the boil schedule longer than an optimum time may begin to contribute to the bitterness, while flavor hops that may be added later in the boil schedule may contribute more to aroma.

The interaction between the bittering, flavor, and aroma hops may illustrate one example where dependencies may exist between different flavor components. In many cases, certain characteristics of the resulting beer may not be independent of each other and changing one characteristic may cause another characteristic to change.

Hops aroma may be adjusted through the user interface component 402 and slider 416. Hops aroma may be adjusted by the length of time that aroma hops are present in the boil at the end of the boil process. Aroma may be decreased by increasing the time aroma hops are in the boil process past a certain point. In some cases, the aroma hops may be added after the boiling has completed and during a cooling step prior to pitching yeast and beginning fermentation.

Figure 5:
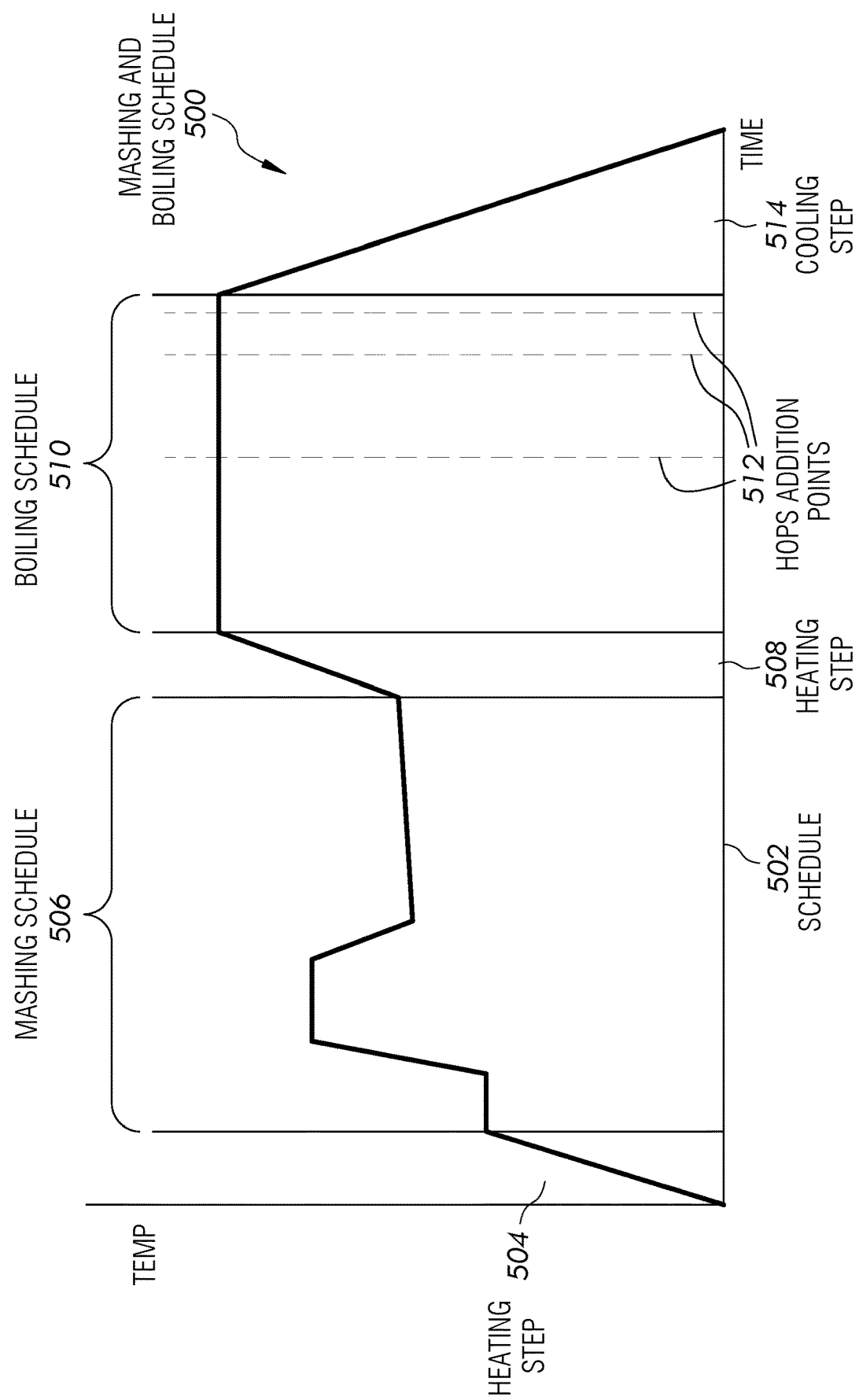
FIG. 5 is a diagram illustration of an embodiment showing a mashing and boiling schedule.

FIG. 5 is a diagram illustration of an example embodiment 500 showing a mashing and boiling schedule 502. The schedule 502 may show temperature versus time, which may reflect the temperature of the wort during production. In many systems, the wort may be transferred through various vessels, flow paths, or other processing equipment during the schedule, but such information is not illustrated here.

The schedule 502 may show a typical mashing and boiling schedule for an automated brewing system. In cases where a brewing system is configured for automatic control of both mashing and boiling, the schedule 502 may reflect the processing steps executed by the automated system. In cases where some of the brewing process is manually performed, the schedule 502 may reflect some processing steps that may be manually performed and some that may be automatically performed.

The schedule 502 may begin with a heating step 504. In many systems, the heating step 504 may involve heating water without contact between the water and grains or other ingredients.

During a mashing schedule 506, the heated water may be in contact with grains and various adjuncts, and the temperature profile may be selected to cause various enzymes to react with the starches in the grains and convert the starches into sugars.

After the mashing schedule 506, a heating step 508 may raise the wort temperature at or near the boiling temperature for a period of time. The boiling schedule 510 may keep the wort at or near the boiling point, and may include various hops addition points 512. In general, bittering hops may be added first, flavor hops added in the middle to end of the boiling schedule, and aroma hops added at the end of the boiling schedule. After completing the boiling schedule 510, a cooling step 514 may reduce the liquid temperature to a point where yeast can be pitched and fermentation begin.

Figure 6:
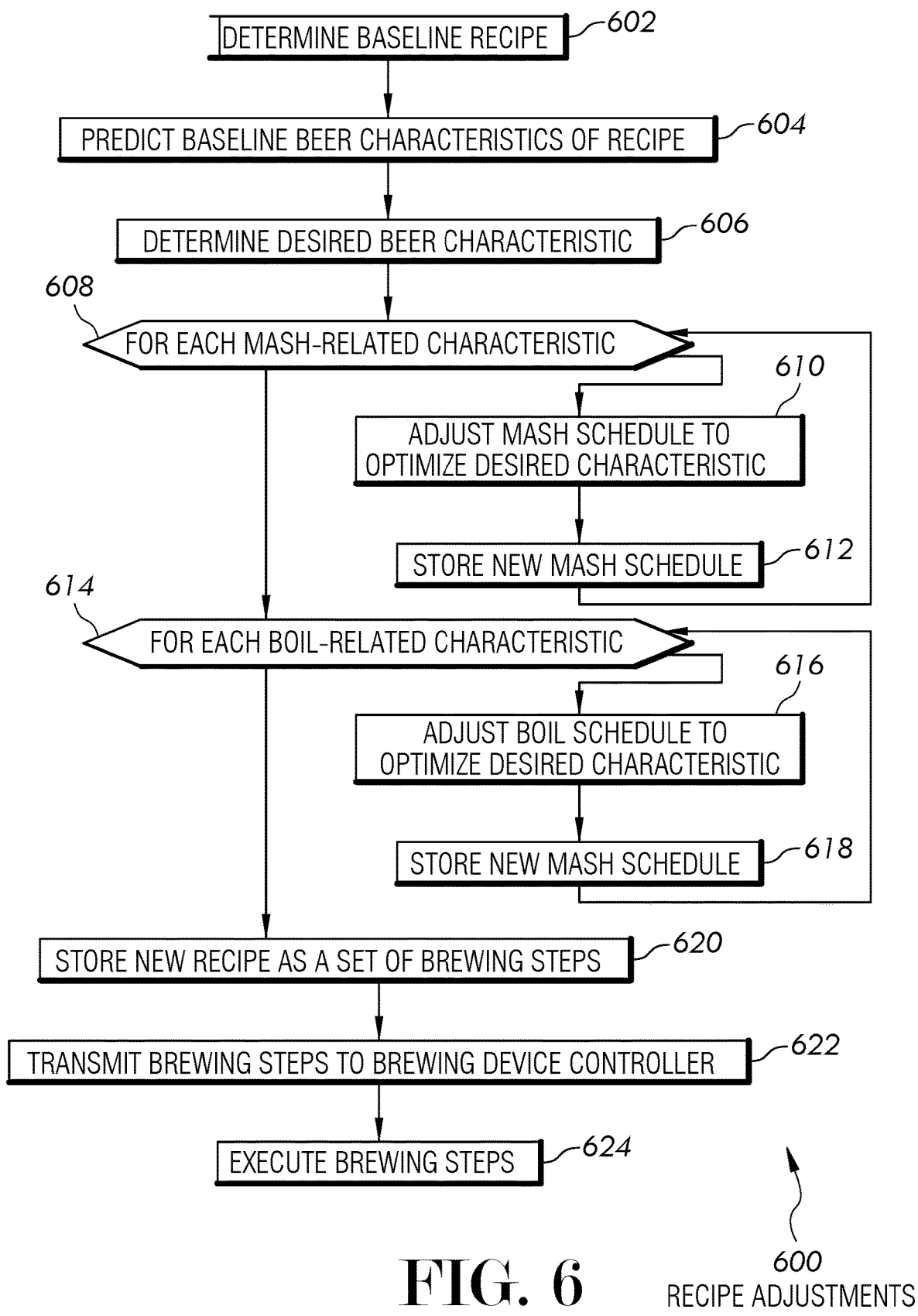
FIG. 6 is a flowchart illustration of an embodiment showing a method for making recipe adjustments.

FIG. 6 is a flowchart illustration of an embodiment 600 showing a method performed by a recipe adjuster. The method of embodiment 600 may be performed prior to executing a brewing sequence and may make changes to a brewing sequence to implement desired changes to the resultant beer given a fixed ingredient list.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 may illustrate a method for updating or changing a mashing schedule or boiling schedule to reflect desired changes to the resulting beer. Examples of changes to beer characteristics were discussed in embodiment 400.

A baseline recipe may be determined in block 602. In many cases, a user may select a baseline recipe as a representative recipe of a certain beer style, for example. The baseline characteristics of the beer may be predicted in block 604. The baseline characteristics may be predicted from a performance model that may calculate various characteristics, which may be beer color, sweetness, mouthfeel, bitterness, aroma, flavor, maltiness, and other characteristics.

A desired set of beer characteristics may be determined in block 606. In some cases, a user may modify a user interface such as exemplified in embodiment 400. In other cases, a beer characteristic may be received through other mechanisms, such as an application programming interface (API), for example.

For each mash-related characteristic in block 608, the mash schedule may be adjusted in block 610 to meet a desired characteristic. The new mash schedule may be stored in block 612. In the example of embodiment 600, the mash-related characteristics may be treated as independent characteristics, meaning that the various characteristics do not depend or interact with each other. In many cases, such an assumption may not be technically accurate, however, for a first order approximation, some embodiments may treat the characteristics as independent.

Similarly, for each boil-related characteristic in block 614, the boil schedule may be adjusted in block 616 to meet the desired characteristic. The new boil schedule may be stored in block 618.

The new recipe may be stored in block 620 as a set of brewing steps, which may be transmitted to the brewing system in block 622 and executed in block 624.

Figure 7:
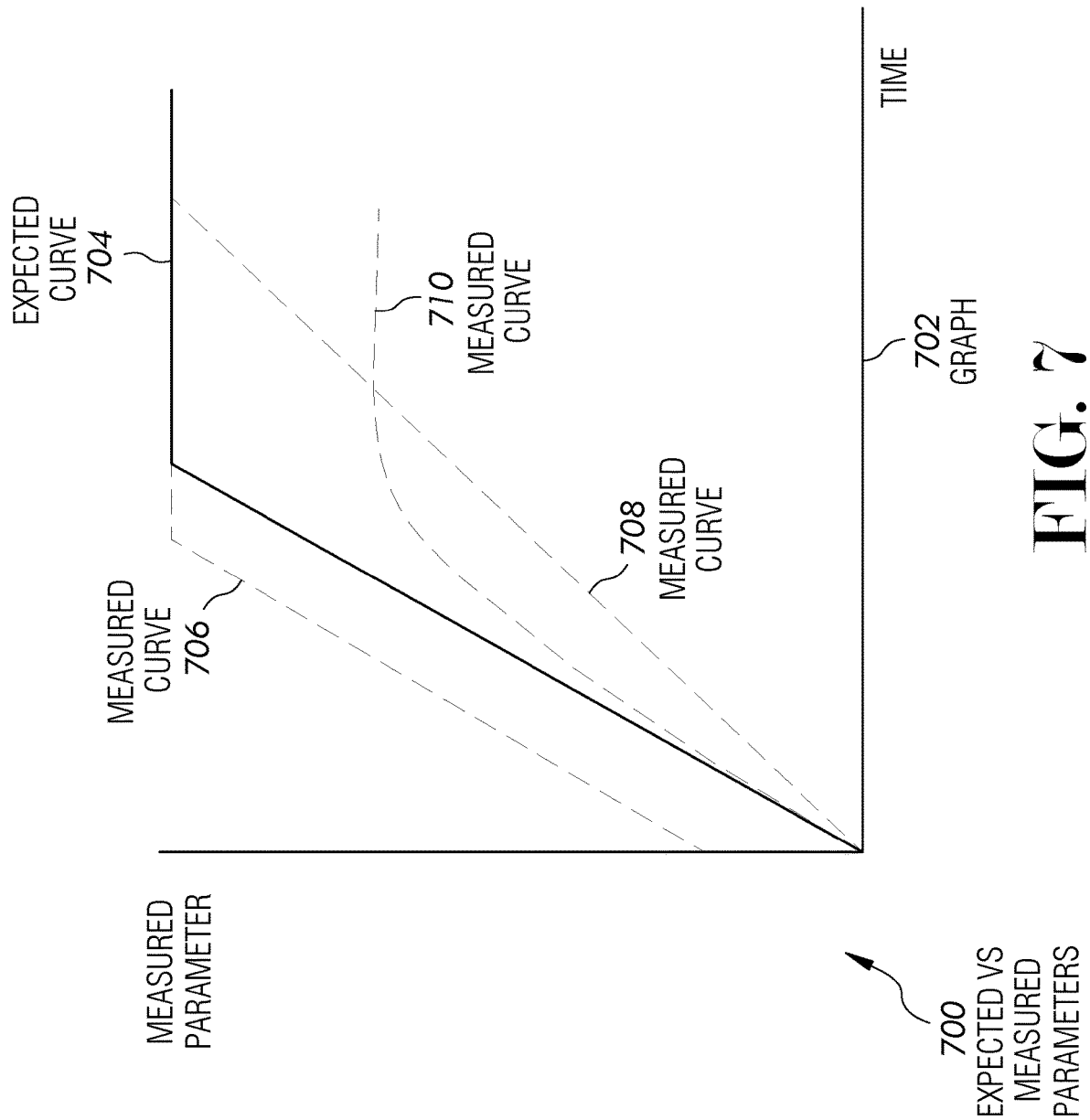
FIG. 7 is a flowchart illustration of an embodiment showing a graph of expected measured parameters.

FIG. 7 is a diagram illustration of an example embodiment 700 illustrating an expected curve 704 and various measured curves.

Embodiment 700 may graphically represent a measured parameter versus time. A measured parameter may be any parameter that an automated beer making system may produce. Examples of such parameters may include temperature, amount of heat applied, flow rates, or any other parameter. The parameters that a brewing system may be capable of measuring may be dependent on the type of brewing system and the construction and instrumentation of such a system.

In many cases, a measured parameter may be a directly measurable parameter, such as temperature. In other cases, the measured parameter may be a proxy for some other wort characteristic, such as light transmission as a proxy for amount of extracted sugar. In some cases, the measured parameter may be a first or second differential of a measured parameter, such as the rate of change of temperature or the second differential of temperature.

Regardless of the actual measured parameter, a control system may determine an expected curve 704, which may reflect the normal or expected behavior of the brewing system.

When a control system receives a measured curve representing measured data points 706, the control system may compare the measured curve 706 to the expected curve or data points 704 and determine that the two curves may be similar, and that the difference may be represented by a mathematical transformation on the expected curve 706. The control system may determine that such a transform may not adversely affect the performance of the brewing system and that the brewing system is otherwise operating normally. In such a case, the control system may continue normal operations.

When a control system receives a measured curve 708, the control system may compare the measured curve 708 to the expected curve 704 and determine that the slope of the two curves is different. The control system may evaluate the difference to determine whether or not the difference indicates an error condition or whether the remaining brewing schedule may be adjusted to compensate for the different slope. An example of such an adjustment is presented later in this specification.

When a control system receives a measured curve 710, the control system may compare the measured curve 710 to the expected curve 704 and determine that the system may have been unable to achieve the parameter value of the expected curve 704. For example, if the expected curve 704 may represent a temperature measurement, the measured curve 710 may indicate where the system was unable to achieve the desired temperature. Such a situation may occur when the system is not configured correctly, if a heating element is not functioning well, the system is not properly cleaned, or some other condition.

A performance model may be trained to recognize an improperly configured system or a system with known error conditions. For example, a brewing system may be intentionally configured with a misconfigured set of hoses. As that brewing system begins operation, a measured curve may be gathered such as measured curve 710. The performance model may be trained with several such measured curves so that a control system may be capable of identifying a poorly operating system and further identify the misconfiguration because of the similarity with the previously observed measured curves.

Figure 8:
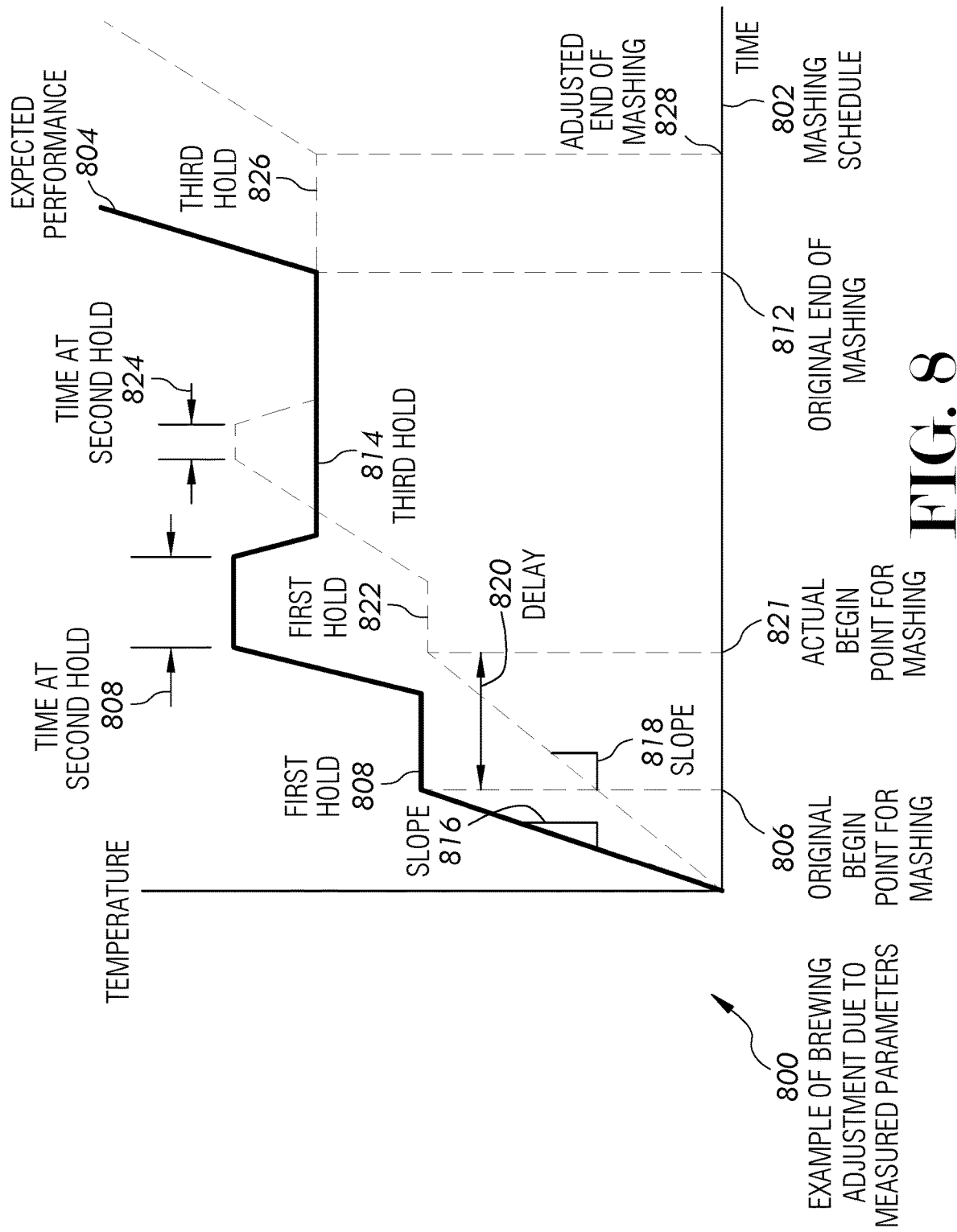
FIG. 8 is a diagram illustration of an embodiment showing an example of brewing adjustment due to measured parameters.

FIG. 8 is a diagram illustration of an example embodiment 800 showing adjustments that may be made to a mashing schedule based on measured parameters received during a brewing session. Embodiment 800 illustrates a mashing schedule 802 showing a curve exhibiting expected performance 804, measured performance, and updated changes to the brewing steps based on the measured performance.

Embodiment 800 is merely one example of how a mashing schedule may be updated to maintain desired characteristics in a resulting beer using a performance model that contains both recipe elements and brewing system performance elements.

In the example of embodiment 800, a curve showing expected performance 804 may illustrate the expected operation of a brewing system. This curve may be represented in brewing steps that may be transmitted to a brewing system and used by a processor to control the brewing system.

The expected performance 804 includes a start point for mashing 806, a first rest 808, a time at a second rest 810, an end of the mash schedule 812, which also defines a third rest 814. At the beginning of the mashing schedule, the liquid may be heated at an expected rate, and the expected rate may be defined by a slope 816.

Measured parameters during the heating phase may indicate that the actual rate of heating may be defined by the slope 818. The slope 818 may show that the system may be unable to heat liquid as fast as expected. Such a deviation from an expected value of the slope 816 may indicate that the mashing schedule may need to be adjusted.

In the example of embodiment 800, the characteristics of the resulting beer may include having a target amount of maltiness. In order to achieve the maltiness, a performance model may indicate that the overall length of time of the mashing session may be limited. The limit may ensure that the mashing process may leave some longer chain sugars in the wort, which may contribute to the maltiness of the resulting beer.

However, if the rest times of the original mashing schedule were maintained, the slower temperature rise times would cause the overall length of the mashing schedule to increase. Based on the desired characteristic of maltiness and using a performance model, the mashing schedule may be adjusted to shorten the time at the second hold 824.

The modified mashing schedule may start at a new beginning point 821, maintain a first hold 822, then transition to a second hold 824. The second hold 824 may have a reduced time from the original second hold 810 in order to maintain a desired overall length of a mashing schedule. A third hold 826 may otherwise cause the mash to end at point 828.

The example of embodiment 800 is merely one example of how a mashing schedule or brewing schedule may be updated after receiving observations about the actual performance of a brewing system. This illustration was selected to illustrate the concepts, which may be applied to many other measured parameters and many other factors that may be calculated from a performance model.

Figure 9:
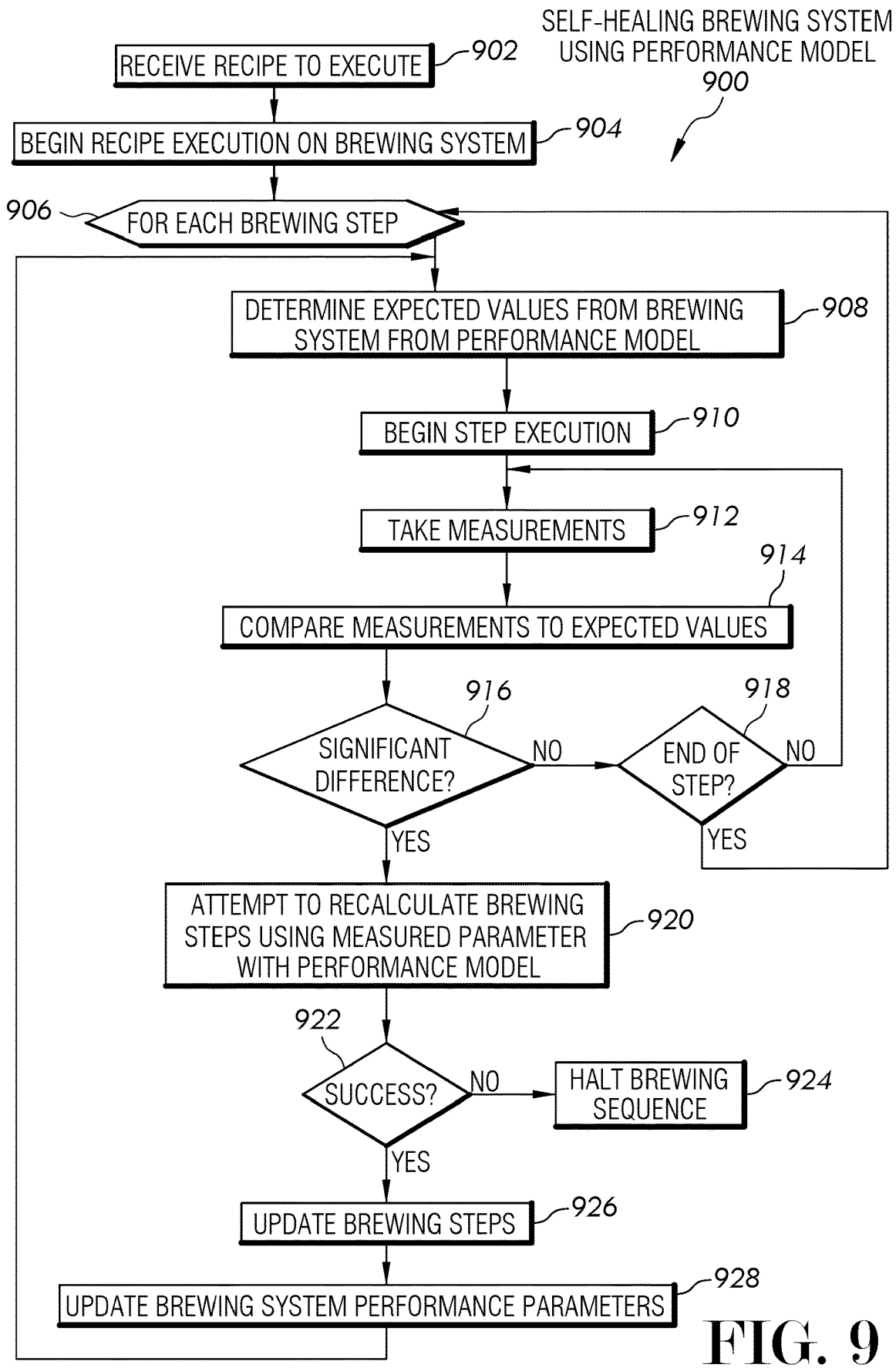
FIG. 9 is a flowchart illustration of an embodiment showing a self-healing brewing system using a performance model.

FIG. 9 is a flowchart illustration of an embodiment 900 showing a method performed by a control system where changes to brewing steps may be made during a brewing session based on measured parameters received from the brewing system.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 900 is a simplified version of a method that may be employed to manage a brewing system. An expected performance may be determined from analyzing a recipe using a performance model, then the expected performance may be compared to measured performance. When deviations occur from the expected performance, the subsequent brewing steps may be updated to maintain a set of desired characteristics in the resulting beer. Such an operation may allow a system to adapt to variations in brewing systems or external conditions yet still produce a beer with a set of desired characteristics.

A recipe may be received in block 902. A brewing system may begin execution of the recipe in block 904. Each brewing step may be analyzed in block 906.

For each brewing step in block 906, a set of expected values may be calculated from a performance model in block 908. The step may begin execution in block 910, and measurements may be taken in block 912. The measurements may be compared to the expected values in block 914. If there is no significant difference between the measured and expected values in block 916 and the end of the brewing step has not occurred in block 918, the process may loop back to step 912 to continue taking measurements during the brewing step.

If the difference between the measured and expected values is statistically significant in block 916, an attempt to recalculate subsequent brewing steps may be performed in block 918.

The recalculating of brewing steps in block 918 may attempt to determine a brewing sequence that may achieve characteristics of the resulting beer even though the brewing system is not performing as expected. When such a recalculation is successful in block 922, the brewing steps may be updated in block 926 and the expected brewing system performance parameters may be updated in block 928. The process may return to block 908 to recalculate the expected values for the current brewing step and continue executing the current brewing step.

If the recalculation in block 920 is not successful in block 922, the brewing sequence may be halted in block 924. In some cases, a user may be alerted to attend to the brewing system or to approve an override, where the user may approve the adjusted brewing sequence even though the system may not be able to achieve the desired characteristics of the resulting beer.

Figure 10:
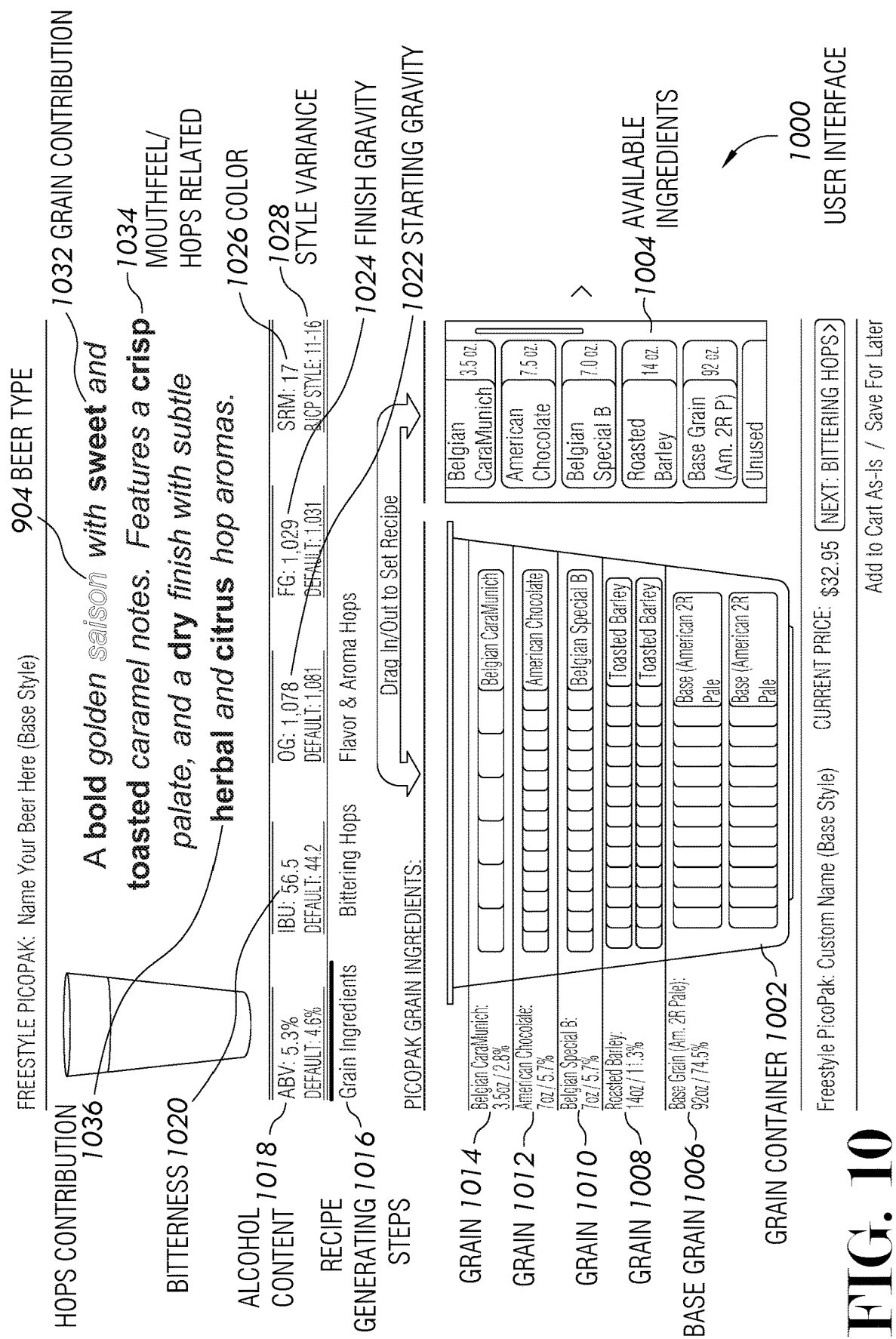
FIG. 10 is a diagram illustration of an example embodiment showing a user interface for selecting grains for mashing.

FIG. 10 is a diagram illustration of a user interface 1000 for creating a beer recipe. The user interface 1000 is merely one example of a user interface through which a user may create and modify a beer recipe.

The user interface 1000 may be illustrated in FIGS. 10-14 showing different operations within the user interface 1000. In general, the recipe building process may follow the recipe generating steps 1016, which begin with adding or removing ingredients from the grains, then bittering hops, then flavor and aroma hops. In the example, the user interface 1000 may display three different containers and sets of ingredients that may be appropriate for that type of container. In the example of FIG. 10, the container is a grain container 1002 and the available ingredients 1004 largely consist of grains or other adjuncts that may be added during a mashing phase of a beer making process.

In many use cases, a user may be given an option for a starting recipe. The starting recipe may be any recipe in a recipe library. In many cases, a system may have a set of recipes that may correspond with a standard style of beer. The standard styles may correspond with the Beer Judge Certification Program style guide, or some other standard styles.

A starting recipe may pre-populate the user interface 1002 with ingredients and various options. From this starting point, the user may make adjustments or alterations to change the recipe to something of their choosing.

The user interface 1002 may be merely one example of a user interface for manipulating recipes. A list of available ingredients 1004 may be shown along with a container, in this case a grain container 1002. The example of user interface 1002 may show three different containers, as will be illustrated in FIGS. 10-14. In this example, a grain container 1002 may contain the ingredients that may be used during a mashing phase of a beer making process.

The grain container 1002 may be illustrated with a base grain 1006, as well as other grains 1008, 1010, 1012, and 1014. Each grain may be listed with the weight of the grain along with the percentage of that grain to the total amount.

The available ingredients 1004 may show a list of different ingredients that may be added during the mashing phase of a beer making process. A user may be able to scroll, sort, and investigate the various ingredients. In many cases, a user may be able to hover, left click, right click, or otherwise select one of the ingredients. The system may display a description of the ingredient along with the effects the ingredient may have in the final beer.

For example, by selecting "American Chocolate," a window may pop up that describes the grain. The description may say something such as: "Use in all beer styles for color adjustment. Use 1-10% for desired color in Porter and Stout. The rich roasted coffee, cocoa flavor is very complementary when used in higher percentages in Porters, Stouts, Brown Ales, and other dark beers. Rich roasted coffee, cocoa SRM/Lovibond=350 Origin: USA."

Such a description may refer to a single ingredient. The user interface 1000 may include a description of a beer manufactured from the recipe.

The description of the beer may include its alcohol content 1018, its overall bitterness 1020, starting gravity 1022, finished gravity 1024, and color 1026. In this example, the alcohol content 1018 may be a percentage alcohol at 5.3%, and the bitterness 1020 may be 56.5 MU or International Bittering Units. The starting gravity 1022 may be a specific gravity of 1.078, while the finished gravity 1024 may be a specific gravity of 1.029. The color 1026 may be 17 on the Standard Reference Method (SRM) of beer color.

Below each numerical description may be a default or standard value. These values may be given for a target beer style. In some cases, when the recipe may vary outside of a target beer style, the default or target values may be highlighted. In the example of user interface 1000, the color 1026 may be outside of the beer style limits, which are displayed to be 11-16.

The description may also include a text based description. In the example of user interface 1000, the description may read "A bold, golden saison with sweet and toasted caramel notes. Features a crisp palate, and a dry finish with subtle herbal and citrus hop aromas."

The beer type 1030 may be the text "A bold, golden saison," while the grain contribution 1032 may be the "sweet and toasted caramel notes." The mouthfeel and hops contribution 1034 may be "Features a crisp palate, and dry finish," while the remaining hops contribution 1036 may be "subtle herbal and citrus hop aromas."

The various text based descriptions may be derived by analyzing the ingredients list to determine the dominate and secondary effects of each set of ingredients, such as the grains and other adjuncts used in mashing, as well as the hops and other adjuncts used during the boil cycle. The user may be able to adjust each of these effects, which may cause the text description to be updated.

FIG. 11 is a diagram illustration of a user interface 1000 where a user may be making a change to a recipe. A grain container 1002 may be illustrated with a list of available ingredients 1004. The base gran 1006 along with secondary grains 1008, 1010, 1012, and 1014 may be shown.

A selected ingredient 1102 may be an amount of American Chocolate grain that may be added to or removed from the grain container 1102.

In the example user interface, a user may select one or more instances of the American Chocolate, which is grain 1012, and may drag and drop them to remove the ingredients from the grain container 1002.

In the example user interface, a container may have many instances of each ingredient. Each instance may represent a specific quantity, such as one ounce, one pound, or some other quantity. The more instances of an icon in the container, the more quantity in the recipe.

When removing ingredients from a recipe, a user may select one or several icons in a container, then drag and drop the icons to some location outside the container. The user may grab multiple icons by shift-selecting several icons, click and drag to select several icons, or use some other user interface mechanism. When multiple icons may be selected, the icons may come from a single type of ingredient or may come from multiple ingredients.

In the example of user interface 1000, the user may have selected the American Chocolate icon from the available ingredients 1004 and may be dragging the icon to the grain container 1002. Such an action may cause one unit of American Chocolate grain to be added. In some cases, a user interface dialog box may appear asking the user to enter the number of units the user may wish to add.

Figure 12:
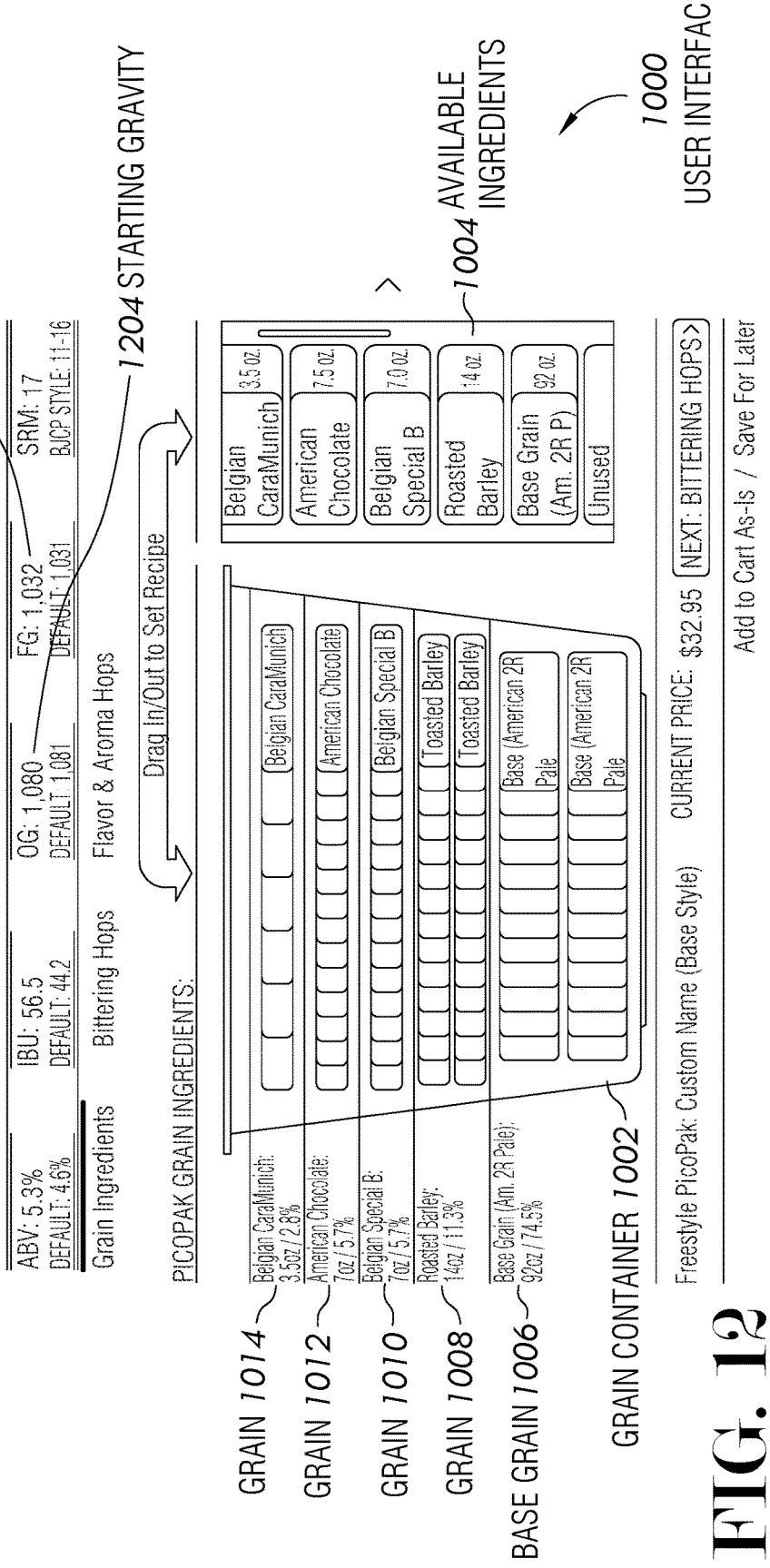
FIG. 12 is a diagram illustration of an example embodiment showing a user interface for modifying grains for mashing.

FIG. 12 is a diagram illustration of user interface 1000 showing the situation after a user has added American Chocolate to the recipe. The user interface 1000 shows the grain container 1002, the available ingredients 1004, and the base grain 1006, and other grains 1008, 1010, 1012, and 1014.

After adding the American Chocolate as illustrated in FIG. 11, the finish gravity 1202 may be updated to 1.080 and the starting gravity 1204 may be updated to 1.032.

FIG. 13 is a diagram illustration of user interface 1000 showing user interaction with bittering hops. A set of icons representing available hops 1302 is shown, along with a bittering hops container 1304.

A user may interact with the icons in the bittering hops container 1304 by dragging and dropping or otherwise manipulating the hops icons within the bittering hops container 1304 and the available hops 1302.

The bittering hops container 1304 may contain base bittering hops 1306 and secondary bittering hops 1308. In this example, the base bittering hops 1306 are 14 ounces of Summit hops, while the secondary bittering hops 1308 are 6 ounces of Chinook hops. The term base bittering hops may be used to refer to the type of hops that contribute the largest portion of the bittering, while the term secondary bittering hops may be used to refer to the type of hops that contribute a lesser portion of the bittering.

As a user may adjust the bittering by adding or removing hops icons to the bittering hops container 1304, an indicator for the bitterness 1310 may be adjusted up or down based on the calculated International Bitterness Units. In some instances, a user may make a sufficient change to the bittering hops to cause the beer type 1030, mouthfeel/hops related 1034, or hops contribution 1036 descriptors to be updated.

Figure 14:
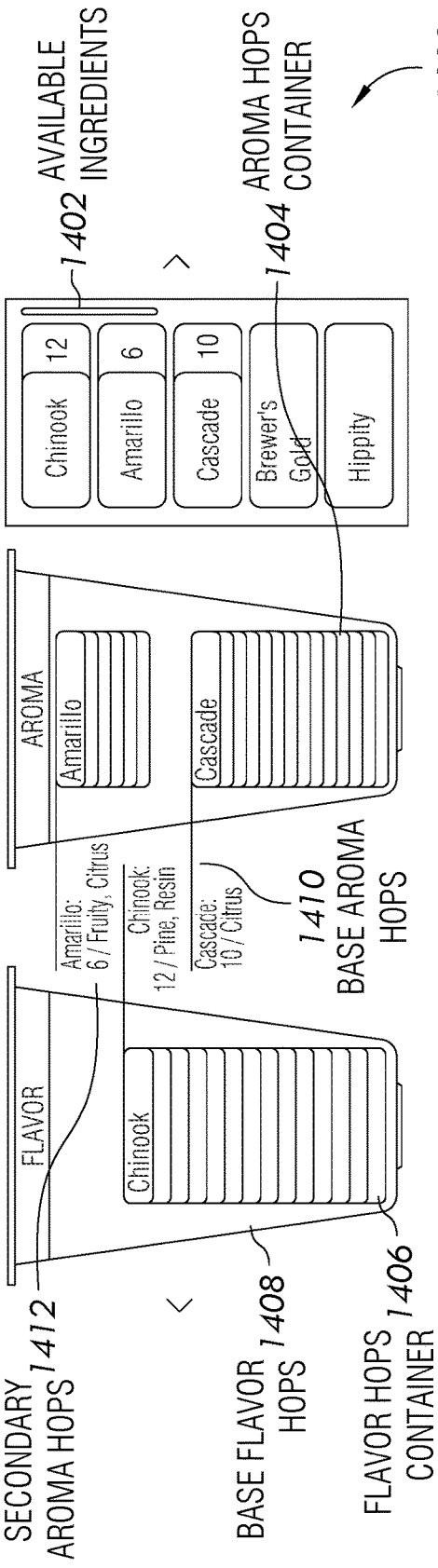
FIG. 14 is a diagram illustration of an example embodiment showing a user interface for selecting flavor and aroma hops.

FIG. 14 is a diagram illustration of user interface 1000 showing user interaction with flavor and aroma hops. A set of icons representing available ingredients 1402 may be shown along with aroma hops container 1404 and flavor hops container 1406.

In general, flavor hops may be added near the end of a boil cycle, which may be the last five to ten minutes. Aroma hops may be added at the very end of the boil cycle, sometimes in the last two to five minutes. The difference between the two uses of hops is the types of volatiles and oils that can be assimilated into the beer during the contact time with the beer or wort at elevated temperatures.

The flavor hops container 1406 in this example may have a base flavor hops 1408. For some beers, a single variety of hops may be used for flavor, while in other beers, two, three, or more varieties of hops may be used for flavor.

The aroma hops container 1404 may have a base aroma hops 1410 as well as a secondary aroma hops 1412. As with the flavor hops, the aroma hops may have one, two, three, or more types of hops for adding aroma to the beer.

Some systems may have several different types of available ingredients other than hops. For example, spices, flavor concentrates, and other ingredients may be offered in the available ingredients in various systems.

Figure 15:
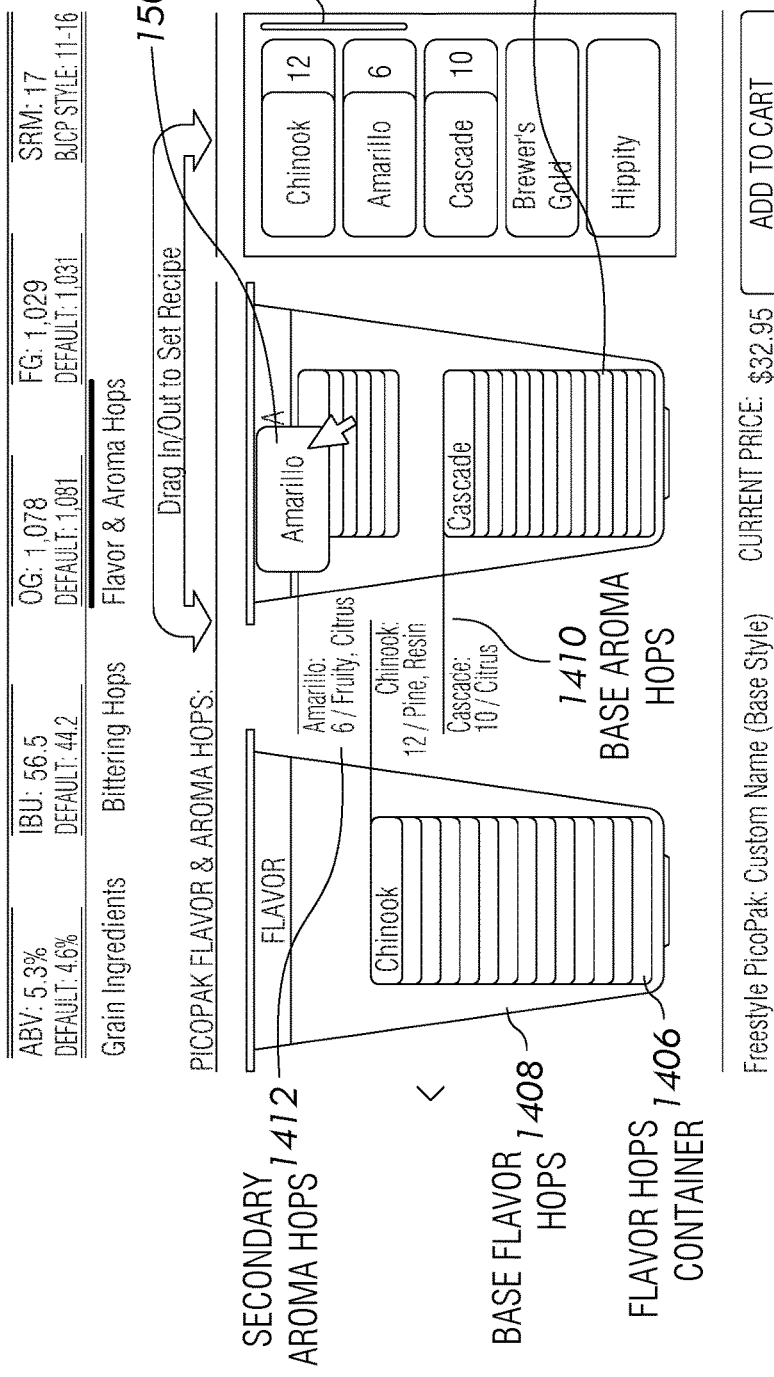
FIG. 15 is a diagram illustration of an example embodiment showing a user interface for changing flavor and aroma hops.

FIG. 15 is a diagram illustration of user interface 1000 showing user interaction with flavor and aroma hops. A set of icons representing available ingredients 1402 may be shown along with aroma hops container 1404 and flavor hops container 1406.

In this example, a user may be interacting with selected hops 1502. In one use, the selected hops 1502 may be selected from the available ingredients 1402 and being added to either the flavor hops container 1406 or the aroma hops container 1404. In another use, the selected hops 1502 may be selected from either the flavor hops container 1406 or the aroma hops container 1404 and may be removed from one of the containers.

The user interactions may increase or decrease the amount of the selected hops 1502 in the eventual recipe. As the user makes changes to the recipe, updates may be made to the text descriptors for the beer as well as the various numerical values calculated for the beer.

Figure 16:
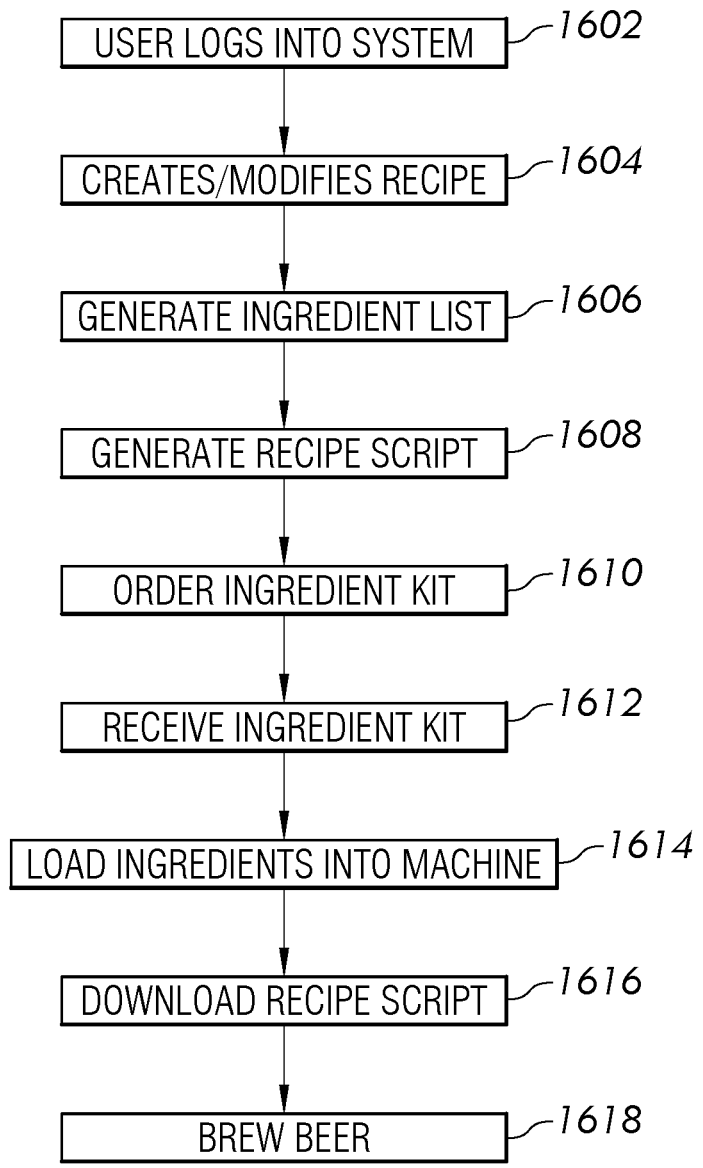
FIG. 16 is a flowchart illustration of an embodiment showing a method for generating a recipe for an automated beer brewing system.

FIG. 16 is a flowchart illustration of an embodiment 1600 showing a method performed by a recipe editor and other components to generate a recipe and brew a beer.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 1600 is a high level process for creating or editing a recipe, then brewing a beer using automated beer making equipment. This is merely one example of how a recipe generator may be used. In other examples, a recipe generator may be used to create a brewing plan and ingredients list for a manually operated brewing system.

A user may log into the recipe generator in block 1602 and may create or modify a recipe in block 1604 to generate an ingredients list in block 1606 and a recipe script in block 1608.

The user may order an ingredient kit in block 1610, receive the ingredient kit in block 1612, load the ingredients in the brewing system in block 1614, download a recipe script in block 1616, and brew beer in block 1618.

Figure 17:
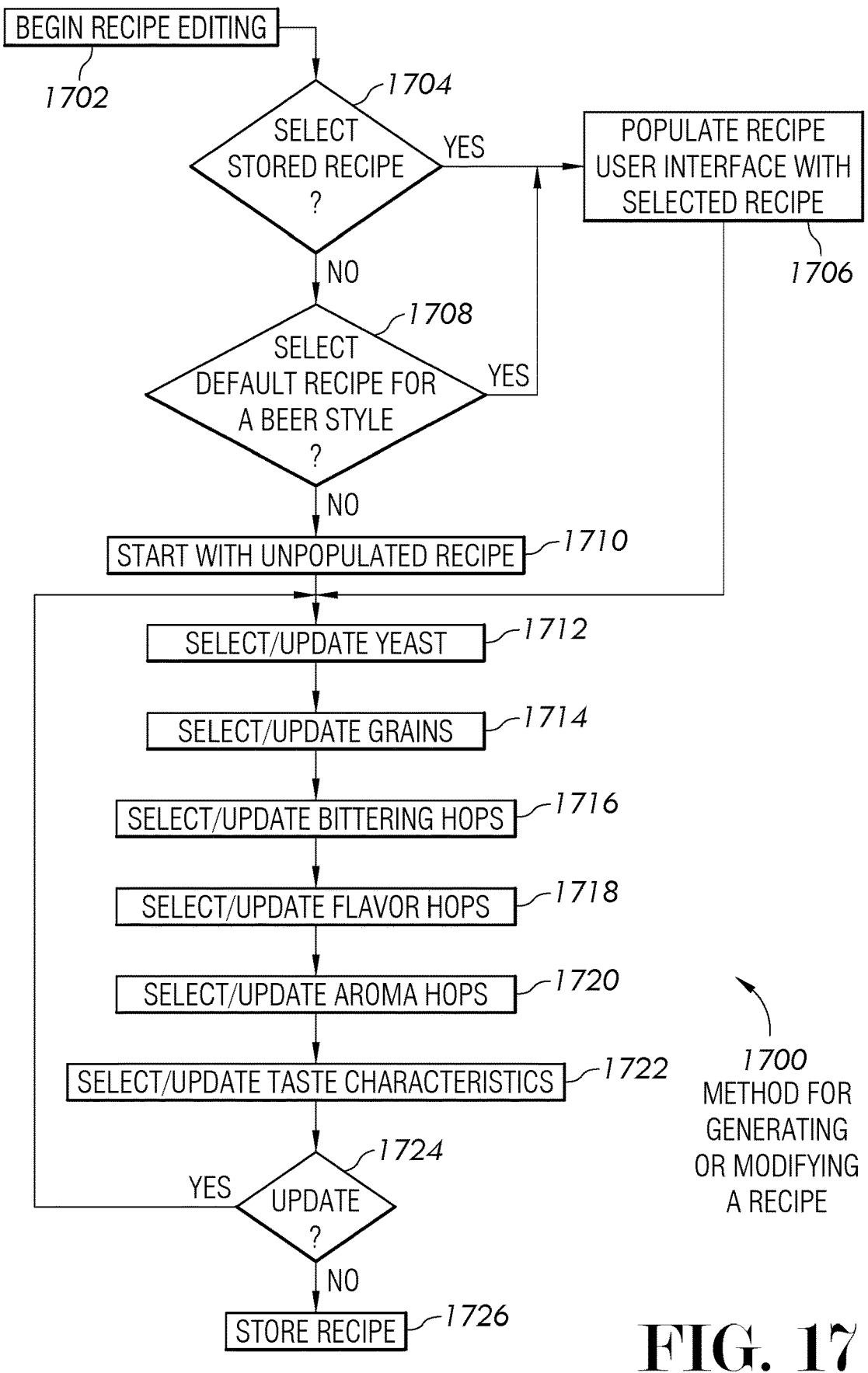
FIG. 17 is a flowchart illustration of an embodiment showing a method for creating and editing a recipe.

FIG. 17 is a flowchart illustration of an embodiment 1700 showing a method performed by a recipe editor to generate a recipe.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The example of embodiment 1700 may illustrate a sequence of user interactions with a recipe builder system, which may have user interface components functionally similar to those illustrated in FIGS. 10-15.

The recipe building sequence may begin in block 1702.

If a user wishes to modify or edit an existing recipe in block 1704, the recipe user interface may be populated in block 1706 with ingredients and parameters associated with the selected recipe.

If a user wishes to begin with a default recipe for a specific beer style in block 1708, the recipe user interface may be populated in block 1706 with ingredients and parameters associated with the selected recipe.

If the user does not wish to use a stored recipe, the user may begin with an unpopulated recipe in block 1710.

A user may be able to select or update a yeast selection in block 1712. The yeast may have significant flavor contributions to the finished beer, and many styles of beer are based around specific strains of yeast.

The user may select or update grains in block 1714, bittering hops in block 1716, flavor hops in block 1718, and aroma hops in block 1720. Example interfaces of such interaction may be found in FIGS. 10-15.

The user may select or update various taste characteristics. Such characteristics may include items such as thick/thin mouthfeel, dry or malty taste, bittering hops intensity, flavor hops intensity, aroma hops intensity, and other factors. An example of such a user interface may be found in FIG. 4.

The user may have the option in block 1724 and circle back to block 1712 to update or change any of the various parameters. When the user is satisfied with the recipe in block 1724, the recipe may be stored in block 1726.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

The invention claimed is:

1. A system comprising:
    a hardware platform comprising a computer processor;
    a control system executing on said hardware platform configured to:
    use a recipe adjuster and a performance model of a computer controlled brewing system, said computer controlled brewing system having a recirculating boiling flow path having a plurality of hops addition flow paths;
    wherein the performance model includes beer characteristics and system operational aspects to control said computer controlled brewing system;
    provide a baseline recipe, said baseline recipe having a first set of ingredients, a first set of beer characteristic, a first mashing schedule, a first boiling schedule, and a first flavor characteristic;
    said first set of beer characteristics being based on the first boiling schedule;
    receive a first user input to adjust said first flavor characteristic to a second flavor characteristic;
    use the recipe adjuster and the performance model to change said first boiling schedule to obtain a second boiling schedule that achieves the second flavor characteristic, wherein the second boiling schedule is obtained when the second flavor characteristic is achieved;
    store said second boiling schedule as part of a second recipe for said computer controlled brewing system; and
    control the plurality of hops addition flow paths using the second boiling schedule.

2. The system of claim 1, said first flavor characteristic being hoppiness.

3. The system of claim 2, when said first user input indicates increasing hoppiness, increasing a circulation time for hops as part of said second boiling schedule.

4. The system of claim 2, when said first user input indicates decreasing hoppiness, decreasing a circulation time for hops as part of said second boiling schedule.

5. The system of claim 1, said first flavor characteristic being hops bitterness.

6. The system of claim 5, when said first user input indicates increasing hops bitterness, increasing a circulation time for an initial hops addition as part of said second boiling schedule.

7. The system of claim 5, when said first user input indicates decreasing hops bitterness, decreasing a circulation time for an initial hops addition as part of said second boiling schedule.

8. The system of claim 1, said first flavor characteristic being hops flavor.

9. The system of claim 8, when said first user input indicates increasing hops flavor, increasing a circulation time for a midpoint hops addition as part of said second boiling schedule.

10. The system of claim 8, when said first user input indicates decreasing hops flavor, decreasing a circulation time for a midpoint hops addition as part of said second boiling schedule.

11. The system of claim 1, said first flavor characteristic being hops aroma.

12. The system of claim 11, when said first user input indicates increasing hops aroma, increasing a circulation time for an ending hops addition as part of said second boiling schedule.

13. The system of claim 11, when said first user input indicates decreasing hops flavor, decreasing a circulation time for an ending hops addition as part of said second boiling schedule.

* * * * *